US012380655B2

(12) United States Patent
Ishikawa et al.

(10) Patent No.: US 12,380,655 B2
(45) Date of Patent: Aug. 5, 2025

(54) INFORMATION PROCESSING DEVICE, INFORMATION PROCESSING METHOD, AND AUGMENTED REALITY SYSTEM

(71) Applicant: SONY GROUP CORPORATION, Tokyo (JP)

(72) Inventors: Tsuyoshi Ishikawa, Tokyo (JP); Jun Kimura, Tokyo (JP); Ikuo Yamano, Tokyo (JP); Shinichi Kawano, Tokyo (JP); Soichiro Inatani, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 179 days.

(21) Appl. No.: 17/758,521

(22) PCT Filed: Nov. 20, 2020

(86) PCT No.: PCT/JP2020/043516
§ 371 (c)(1),
(2) Date: Jul. 8, 2022

(87) PCT Pub. No.: WO2021/145067
PCT Pub. Date: Jul. 22, 2021

(65) Prior Publication Data
US 2023/0031913 A1 Feb. 2, 2023

(30) Foreign Application Priority Data
Jan. 17, 2020 (JP) .................... 2020-006411

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0172* (2013.01); *G06F 3/014* (2013.01);
(Continued)

(58) Field of Classification Search
None
See application file for complete search history.

(56) References Cited

U.S. PATENT DOCUMENTS

2015/0193985 A1    7/2015  Takemoto et al.
2016/0054798 A1    2/2016  Messingher et al.
(Continued)

FOREIGN PATENT DOCUMENTS

CN    106575159 A    4/2017
CN    110249290 A    9/2019
(Continued)

OTHER PUBLICATIONS

International Search Report and Written Opinion of PCT Application No. PCT/JP2020/043516, issued on Dec. 28, 2020, 13 pages of ISRWO.

*Primary Examiner* — James A Thompson
(74) *Attorney, Agent, or Firm* — CHIP LAW GROUP

(57) ABSTRACT

Provided is an information processing device that processes information regarding augmented reality.
The information processing device includes an acquisition unit configured to acquire a position and a posture, or a shape of a first part on a body of a user, and a control unit configured to control a virtual object to be displayed in a real space on a display device on the basis of the position and the posture, or the shape of the first part. When recognizing that the first part has performed a first operation for a second part on the body of the user on the basis of the position and the posture, or the shape of the first part acquired by the acquisition unit, the control unit stores an execution state of the virtual object in association with the second part, and stops display of the virtual object by the display device.

18 Claims, 22 Drawing Sheets

(51) Int. Cl.
   *G06F 3/01*    (2006.01)
   *G06T 7/50*    (2017.01)
   *G06T 7/62*    (2017.01)
   *G06T 7/70*    (2017.01)
   *G06T 19/20*   (2011.01)
   *G06V 40/10*   (2022.01)

(52) U.S. Cl.
   CPC .................. *G06T 7/50* (2017.01); *G06T 7/62* (2017.01); *G06T 7/70* (2017.01); *G06T 19/20* (2013.01); *G06V 40/11* (2022.01); *G02B 2027/0178* (2013.01)

(56) References Cited

U.S. PATENT DOCUMENTS

| | | | |
|---|---|---|---|
| 2018/0095635 A1* | 4/2018 | Valdivia | G02B 27/0093 |
| 2019/0087019 A1* | 3/2019 | Raja | G06F 3/011 |
| 2019/0324526 A1 | 10/2019 | Suzuki et al. | |
| 2019/0369807 A1* | 12/2019 | Fujiwara | G06F 3/0425 |
| 2020/0368616 A1* | 11/2020 | Delamont | H04N 13/239 |
| 2022/0283646 A1* | 9/2022 | Schwarz | G06F 3/04815 |

FOREIGN PATENT DOCUMENTS

| | | | |
|---|---|---|---|
| EP | 3582068 A1 | 12/2019 | |
| JP | 2009-104249 A | 5/2009 | |
| JP | 2014-093050 A | 5/2014 | |
| JP | 2016-162321 A | 9/2016 | |
| JP | 2017530452 A | 10/2017 | |
| JP | 2018-014119 A | 1/2018 | |
| WO | 2018/008226 A1 | 1/2018 | |
| WO | 2018/146922 A1 | 8/2018 | |

\* cited by examiner

BACK

VIRTUAL OBJECT 1101

INFORMATION PROCESSING DEVICE, INFORMATION PROCESSING METHOD, AND AUGMENTED REALITY SYSTEM

CROSS REFERENCE TO RELATED APPLICATIONS

This application is a U.S. National Phase of International Patent Application No. PCT/JP2020/043516 filed on Nov. 20, 2020, which claims priority benefit of Japanese Patent Application No. JP 2020-006411 filed in the Japan Patent Office on Jan. 17, 2020. Each of the above-referenced applications is hereby incorporated herein by reference in its entirety.

TECHNICAL FIELD

The technology (hereinafter referred to as "present disclosure") disclosed in the present specification relates to an information processing device and an information processing method for processing information regarding augmented reality, a computer program, and an augmented reality system.

BACKGROUND ART

Virtual reality (VR), augmented reality (AR), and mixed reality (MR) have become widespread as technologies for implementing an experience with a realistic feeling. VR is a technology for allowing a user to perceive a virtual space as real. Furthermore, AR is a technology of adding information to a real environment surrounding a user, or enhancing, attenuating, or deleting information to expand the real space viewed from the user. Furthermore, MR is a technology of displaying virtual information corresponding to a real space to mix reality and virtual reality. AR and MR are implemented using, for example, a see-through-type head mounted display (hereinafter also referred to as "AR glasses") (see, for example, Patent Document 1). According to the AR technology, it is possible to superimpose and display digital information, emphasize or attenuate a specific real object, or delete a specific real object to make it appear as if the specific real object does not exist on scenery in the real space observed by the user through the AR glasses.

CITATION LIST

Patent Document

Patent Document 1: Japanese Patent Application Laid-Open No. 2014-93050

SUMMARY OF THE INVENTION

Problems to be Solved by the Invention

An object of the present disclosure is to provide an information processing device and an information processing method for processing information regarding augmented reality, a computer program, and an augmented reality system.

Solutions to Problems

A first aspect of the present disclosure is an information processing device including:

an acquisition unit configured to acquire a position and a posture, or a shape of a first part on a body of a user; and a control unit configured to control a virtual object to be displayed in a real space on a display device on the basis of the position and the posture, or the shape of the first part.

When recognizing that the first part has performed a first operation for a second part on the body of the user on the basis of the position and the posture, or the shape of the first part acquired by the acquisition unit, the control unit stores an execution state of the virtual object in association with the second part, and stops display of the virtual object by the display device.

Furthermore, when recognizing that the first part has performed a second operation for a second part on the body of the user on the basis of the position and the posture, or the shape of the first part acquired by the acquisition unit, the control unit restores the display of the virtual object on the basis of the execution state stored in association with the second part.

Furthermore, a second aspect of the present disclosure is an information processing method including:

an acquisition step of acquiring a position and a posture, or a shape of a first part on a body of a user; and a control step of controlling a virtual object to be displayed in a real space on a display device on the basis of the position and the posture, or the shape of the first part.

Furthermore, a third aspect of the present disclosure is a computer program described in a computer-readable form to cause a computer to function as:

an acquisition unit configured to acquire a position and a posture, or a shape of a first part on a body of a user; and a control unit configured to control a virtual object to be displayed in a real space on a display device on the basis of the position and the posture, or the shape of the first part.

The computer program according to the third aspect of the present disclosure defines a computer program described in a computer-readable form so as to implement predetermined processing on the computer. In other words, by installing the computer program according to the third aspect of the present disclosure in the computer, a cooperative action is exerted on the computer, and similar action and effect to those of the information processing device according to the first aspect of the present disclosure can be obtained.

Furthermore, a fourth aspect of the present disclosure is an augmented reality system including:

a display device configured to display a virtual object in a real space;

an acquisition unit configured to acquire a position and a posture, or a shape of a first part on a body of a user; and a control unit configured to control display of the virtual object on the basis of the position and the posture, or the shape of the first part.

Note that the term "system" as used herein refers to a logical assembly of a plurality of devices (or functional modules that implement specific functions), and it does not matter whether or not the devices or the functional modules are in a single housing.

Effects of the Invention

According to the present disclosure, it is possible to provide an information processing device, an information processing method, a computer program, and an augmented reality system that control a motion of a virtual object to be displayed to a user on the basis of a position and a posture of a finger of the user.

Note that the effects described in the present specification are merely examples, and the effects brought by the present disclosure are not limited thereto. Furthermore, the present disclosure may further exhibit additional effects in addition to the above effects.

Still other objects, features, and advantages of the present disclosure will become clear from more detailed description based on embodiments and attached drawings to be described below.

MODE FOR CARRYING OUT THE INVENTION

Figure 1:
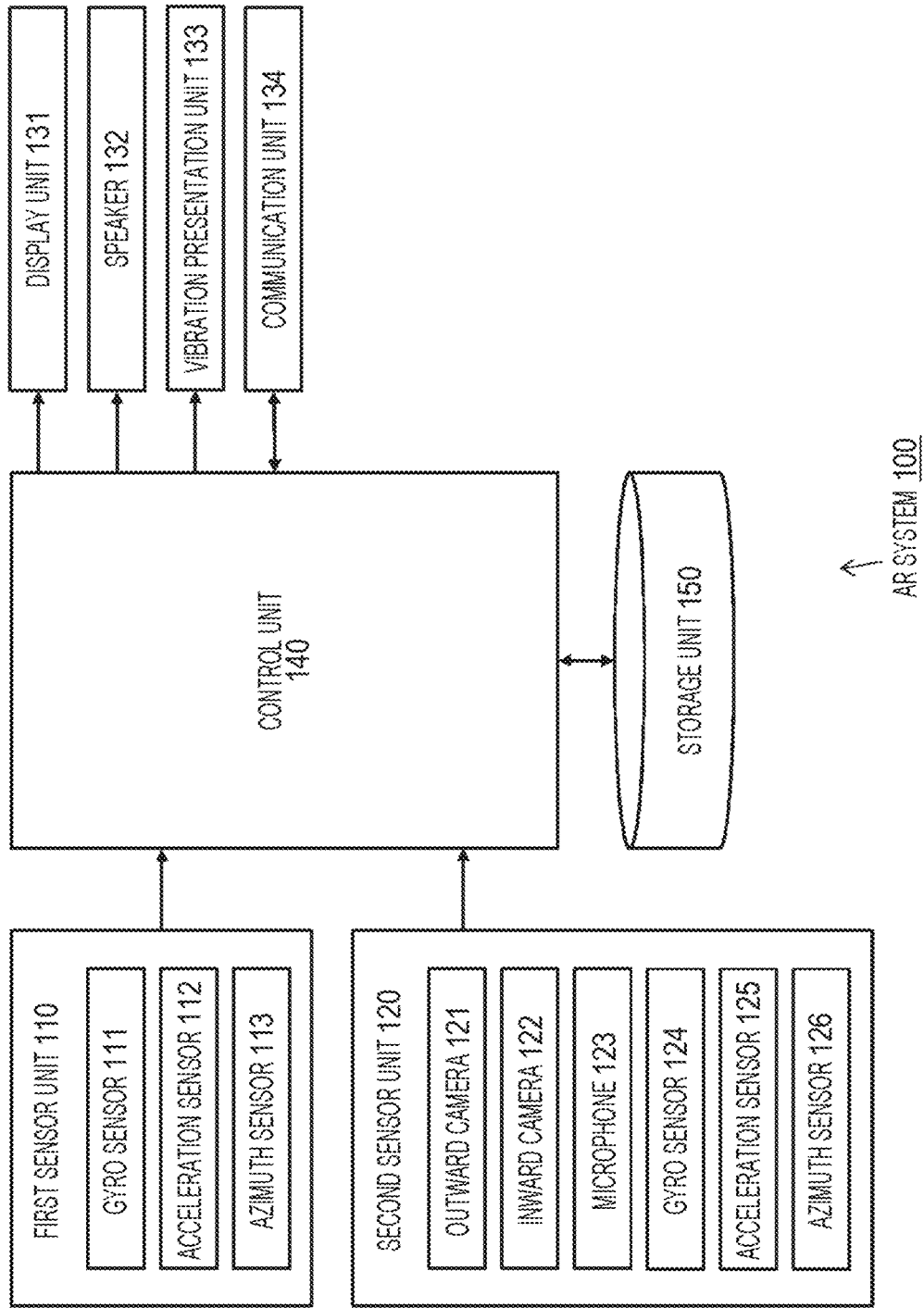
FIG. 1 is a diagram illustrating a functional configuration example of an AR system 100.

Hereinafter, embodiments of the present disclosure will be described in detail with reference to the drawings.

An operating system (OS) such as Windows or Linux (registered trademark) uses a user interface (UI) that minimizes a window of an application obstructive if arranged on a screen and stores the window in, for example, a task bar in a lower edge of the screen. In a case where a plurality of applications is simultaneously activated, windows of obstructive applications are minimized and retracted to a periphery of the screen, so that the screen is organized.

Meanwhile, on AR glasses, for example, when an application of moving image reproduction or a viewer of a 3D object is activated (hereinafter, the application activated on the AR glasses is also referred to as an "AR application"), the AR application being activated is superimposed and displayed on a user's field of view, but there is no UI that minimizes the AR application, and the user need to close the AR application in order to make the obstructive AR application invisible from the field of view. When the AR application is closed, an execution state of the AR application is discarded and the state returns to an initial state, which is inconvenient. For example, when the AR application for moving image reproduction is once closed and activated next time, it is not easy to restore the execution state immediately before closing since a reproduction position of content and information of the content having been reproduced are discarded.

Furthermore, in an OS such as Windows or Linux (registered trademark), an operation for an application being activated is performed via an input device such as a keyboard, a mouse, or a touch panel. On the AR glasses, a controller for the user to operate the AR application may be used. However, the user can see a real space through the AR glasses, and the user preferably uses the AR glasses while performing daily life in the real space, such as walking or gripping an object (including a real object and a virtual object). Therefore, it is preferable that fingers are not restrained by holding the controller or the like, and the fingers are in a freely available state. In addition, it is preferable to store and restore the AR application and to operate the AR application after the restoration with a finger. Furthermore, it is preferable that the user can perform an operation to store or restore the AR application with a finger without looking away while directing a line-of-sight to a display position of the AR application in front of the user, instead of looking at the hand.

Some AR glasses are equipped with an outward camera for observing the real space. An operation of a hand or a finger of the user or other gestures can be input on the basis of image recognition of an image captured by the outward camera. However, it is not possible to input an operation of a finger of the user performed at a position out of the field of view of the outward camera located at a head position of the user. Furthermore, when occlusion occurs such as the user's hand being hidden behind another object, the operation of the hand or the finger cannot be captured by the outward camera. Furthermore, there is a case where it is not possible to accurately acquire presence or absence of contact between a hand or a fingertip and an object or a shape of the finger in contact with the object from image recognition of an image captured by the outward camera.

Therefore, in the present disclosure, information regarding the shape of the finger is acquired using a sensor unit that detects a position and a posture of the finger of the user, and the AR application is stored and restored on the basis of the acquired shape of the finger.

A. System Configuration

FIG. 1 illustrates a functional configuration example of an AR system 100 to which the present disclosure is applied. The illustrated AR system 100 includes a first sensor unit 110 that detects the position of the hand of the user wearing the AR glasses and detects the shape of the finger of the user, a second sensor unit 120 mounted on the AR glasses, a display unit 131 that displays a virtual object such as the AR application on the AR glasses, and a control unit 140 that comprehensively controls the entire operation of the AR system 100. The first sensor unit 110 includes a gyro sensor 111, an acceleration sensor 112, and an azimuth sensor 113. The second sensor unit 120 is mounted on the AR glasses and includes an outward camera 121, an inward camera 122, a microphone 123, a gyro sensor 124, an acceleration sensor 125, and an azimuth sensor 126.

Furthermore, the AR system 100 may further include a speaker 132 that outputs an audio signal such as a voice related to the virtual object, a vibration presentation unit 133 that performs feedback by vibration presentation to the back of the hand or other body parts of the user, and a communication unit 134 for the AR system 100 to communicate with an outside. Furthermore, the control unit 140 may be equipped with a large-scale storage unit 150 including a solid state drive (SSD) or the like.

Figure 2:
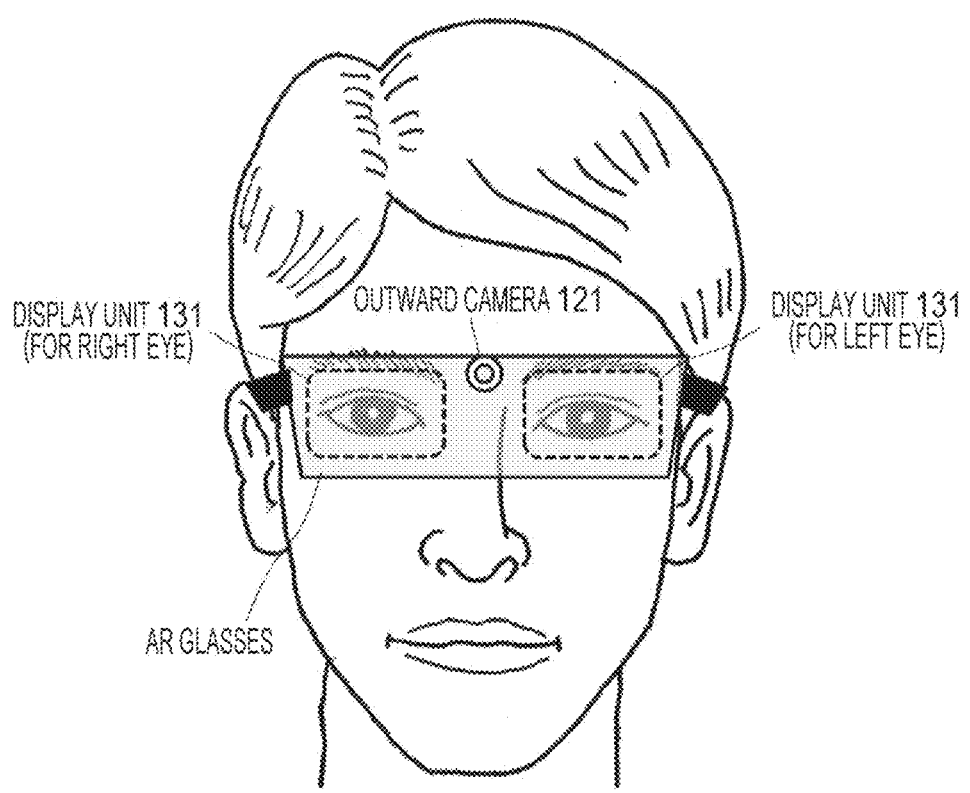
FIG. 2 is a diagram illustrating a state in which AR glasses are worn on the head of a user.

A main body of the AR glasses is generally an eyeglass-type or goggle-type device, and is used by being worn on the head of the user, and can superimpose and display digital information on the field of view of both eyes or one eye of the user, emphasize or attenuate a specific real object, or delete a specific real object to make it appear as if the specific real object does not exist. FIG. 2 illustrates a state in which the AR glasses are worn on the head of the user. In the illustrated AR glasses, the display unit 131 for the left eye and the display unit 131 for the right eye are disposed in front of the right and left eyes of the user, respectively. The display unit 131 is transparent or translucent, and superimposes and displays a virtual object on the scenery in the real space, emphasizes or attenuates the specific real object, or deletes the specific real object to make it appear as if the specific real object does not exist. The right and left display units 131 may be independently display-driven, for example, to display a parallax image, that is, a virtual object in 3D. Furthermore, the outward camera facing a line-of-sight direction of the user is arranged substantially at the center of the AR glasses.

Figure 3:
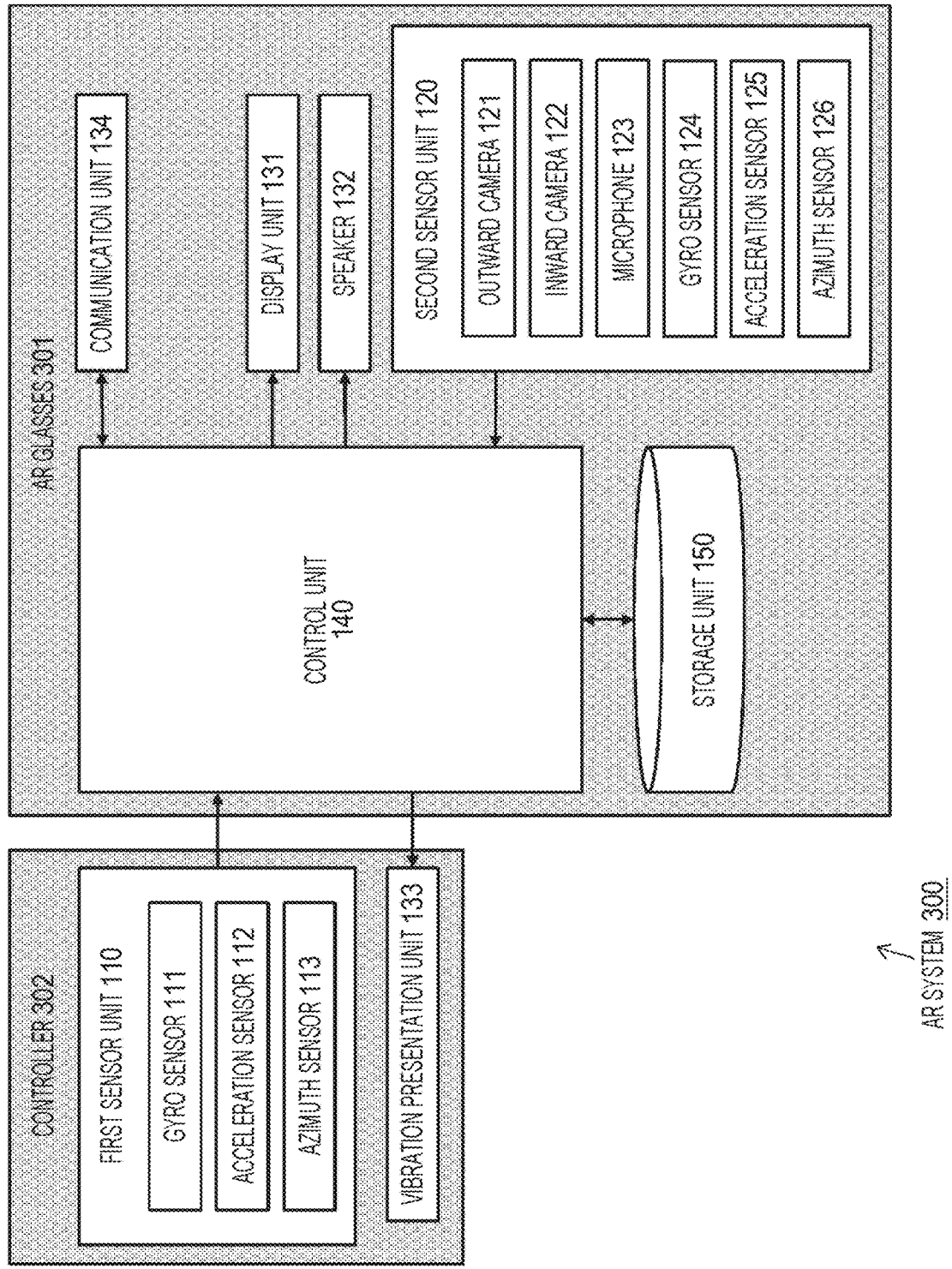
FIG. 3 is a diagram illustrating a configuration example of an AR system 300.

The AR system 100 can be configured by two devices, for example, the AR glasses worn on the head of the user and a controller worn on a hand of the user. FIG. 3 illustrates a configuration example of an AR system 300 including AR glasses 301 and a controller 302. The AR glasses 301 include the control unit 140, the storage unit 150, the second sensor unit 120, the display unit 131, the speaker 132, and the communication unit 134. Furthermore, the controller 302 includes the first sensor unit 110 and the vibration presentation unit 133.

Figure 4:
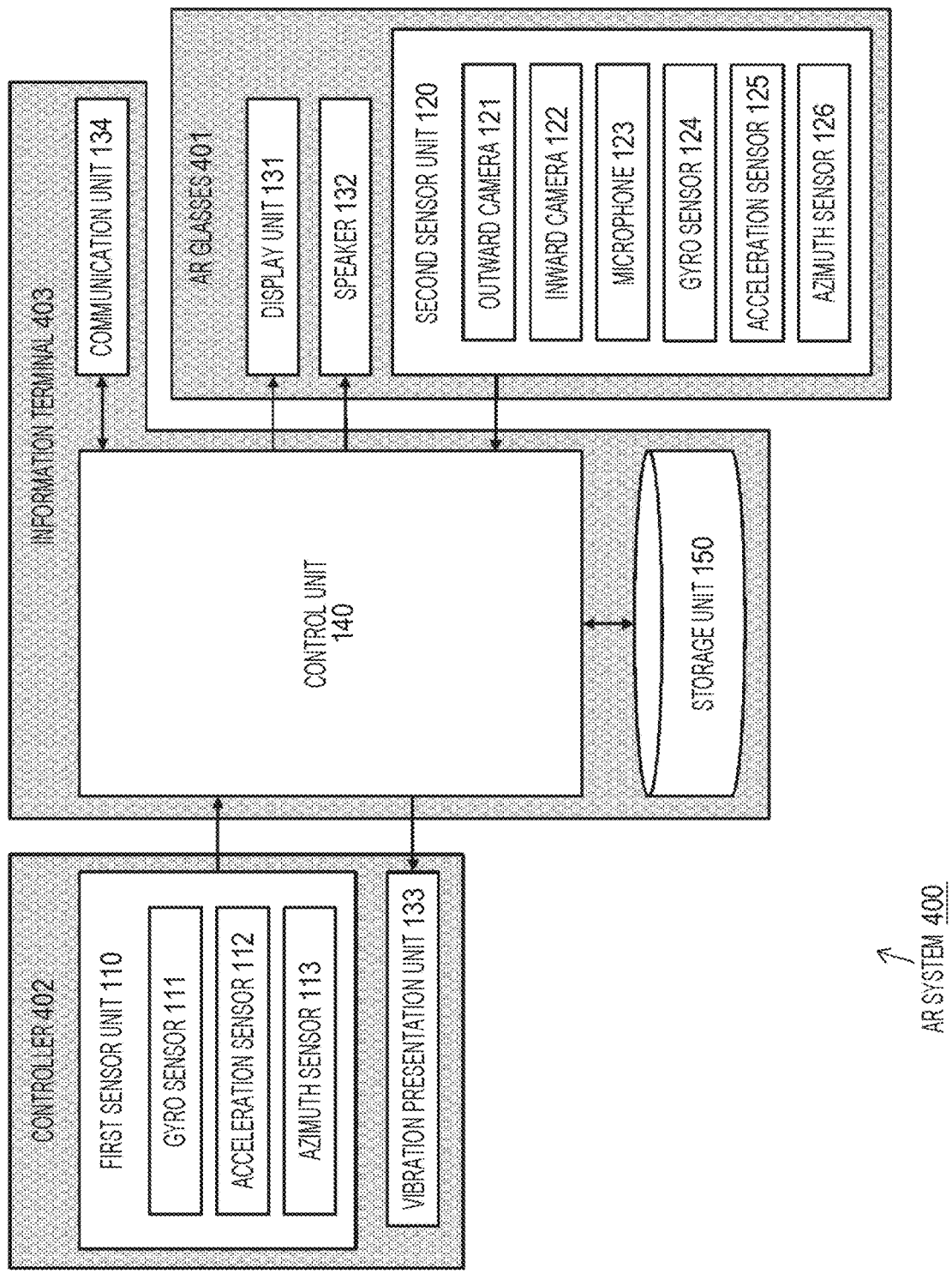
FIG. 4 is a diagram illustrating a configuration example of an AR system 400.

As another configuration example, the AR system 100 is configured by three devices of the AR glasses worn on the head of the user, the controller worn on the hand of the user, and an information terminal such as a smartphone or a tablet. FIG. 4 illustrates a configuration example of an AR system 400 including AR glasses 401, a controller 402, and an information terminal 403. The AR glasses 401 include the display unit 131, the speaker 132, and the second sensor unit 120. The controller 402 includes the first sensor unit 110 and the vibration presentation unit 133. Furthermore, the information terminal 403 includes the control unit 140, the storage unit 150, and the communication unit 134.

Note that the specific device configuration of the AR system 100 is not limited to FIGS. 3 and 4. Furthermore, the AR system 100 may further include components other than those illustrated in FIG. 1.

Each component of the AR system 100 will be described.

As also illustrated in FIGS. 3 and 4, the first sensor unit 110 and the vibration presentation unit 133 are configured as a controller to be worn on the hand of the user. The first sensor unit 110 includes the gyro sensor 111, the acceleration sensor 112, and the azimuth sensor 113. The first sensor unit 110 may be an inertial measurement unit (IMU) including a gyro sensor, an acceleration sensor, and an azimuth sensor. Furthermore, the vibration presentation unit 133 is configured by arranging electromagnetic or piezoelectric vibrators in an array. A sensor signal of the first sensor unit 110 is transferred to the control unit 140.

Figure 5:
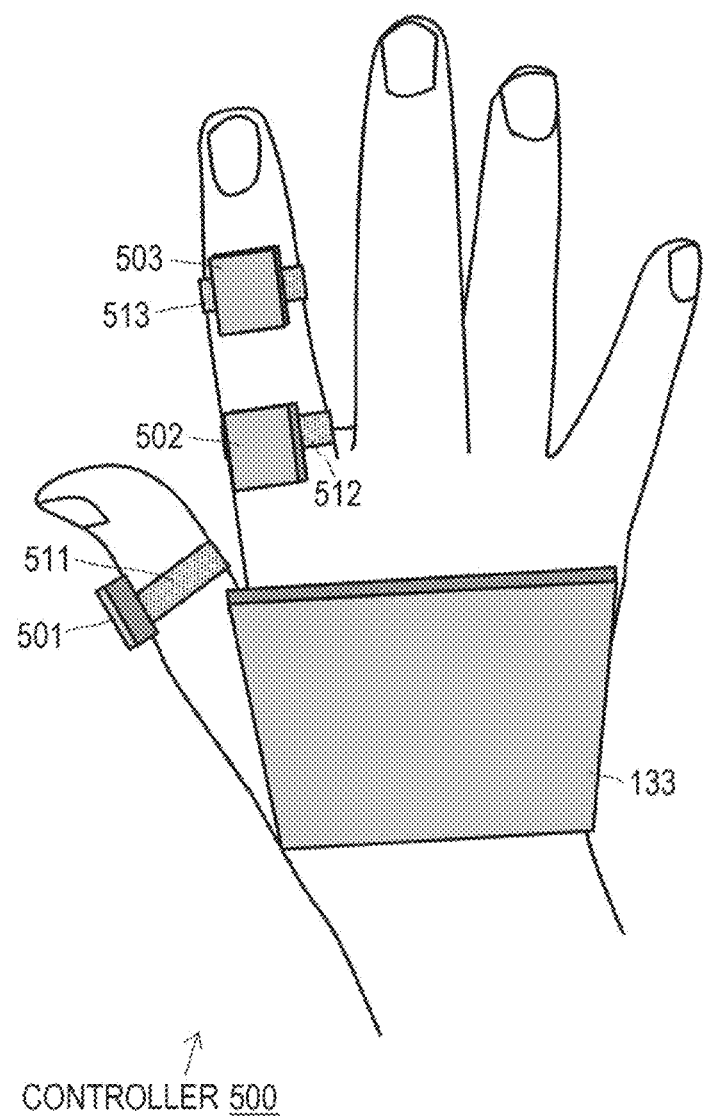
FIG. 5 is a diagram illustrating an example in which a controller 400 is worn on a hand of the user.

FIG. 5 illustrates an example in which a controller 500 including the first sensor unit 110 and the vibration presentation unit 133 is worn on the hand of the user. In the example illustrated in FIG. 5, IMUs 501, 502, and 503 are attached to three places of a thumb and a proximal phalanx and a middle phalanx of an index finger by bands 511, 512, and 513, respectively. Furthermore, the vibration presentation unit 133 is attached to the back of the hand. As a result, the posture of the thumb and the postures of the proximal phalanx and the middle phalanx of the index finger (alternatively, an angle of a second joint of the index finger) can be measured. The vibration presentation unit 133 may be fixed to the back of the hand with a band (not illustrated), an adhesive pad, or the like.

However, FIG. 5 illustrates an example of the first sensor unit 110, and other IMUs may be further attached to other locations of the thumb and the index finger, or the IMUs may be attached to fingers other than the thumb and the index finger. Furthermore, the method of fixing the IMU to each finger is not limited to the band. Furthermore, FIG. 5 illustrates an example in which the first sensor unit 110 and the vibration presentation unit 133 are attached to the right hand, but they may be attached to the left hand instead of the right hand, or may be attached to both hands.

Furthermore, it is assumed that there is a wired or wireless transmission path for transmitting the sensor signal by the first sensor unit 110 (in the example illustrated in FIG. 5, the IMUs 501, 502, and 503) to the control unit 140 and receiving a drive signal of the vibration presentation unit 133 from the control unit 140. The control unit 140 can detect the position and posture of the finger on the basis of the sensor signal of the first sensor unit 110. As illustrated in FIG. 5, in the case where the IMUs 501, 502, and 503 are attached to the three positions of the thumb and the proximal phalanx and the middle phalanx of the index finger, the control unit 140 can recognize the position and posture of the finger (alternatively, the shape of the finger) and the gesture of the finger, such as an opening angle between the thumb and the index finger, an angle of a second joint of the index finger, and presence or absence of contact between the thumb and a fingertip of the index finger, on the basis of detection signals of the IMUs 501, 502, and 503.

Referring again to FIG. 1, the description of each component of the AR system 100 continues.

The second sensor unit 120 is mounted on the AR glasses and includes the outward camera 121, the inward camera 122, the microphone 123, the gyro sensor 124, the acceleration sensor 125, and the azimuth sensor 126.

The outward camera 121 includes, for example, an RGB camera, and is installed to capture the outside of the AR glasses, that is, a front direction of the user wearing the AR glasses. The outward camera 121 can capture an operation of the finger of the user but cannot capture the operation of the finger of the user in a case where the finger of the user is hidden behind an obstacle, in a case where the fingertip is hidden behind the back of the hand, in a case where the user puts the hand behind the body, or the like. Furthermore, the outward camera 121 may further include any one of an IR camera including an IR light emitting unit and an IR light receiving unit or a time of flight (TOF) camera. In a case of using the IR camera as the outward camera 121, a retroreflective material is attached to an object to be captured, such as the back of a hand, and the IR camera emits infrared light and receives infrared light reflected from the retroreflective material. An image signal captured by the outward camera 121 is transferred to the control unit 140.

The inward camera 122 includes, for example, an RGB camera, and is installed to capture the inside of the AR glasses, specifically, the eyes of the user wearing the AR glasses. The line-of-sight direction of the user can be detected on the basis of the captured image of the inward camera 122. The image signal captured by the inward camera 122 is transferred to the control unit 140.

The microphone 123 may be a microphone array including a single sound collection element or a plurality of sound collection elements. The microphone 123 collects a voice of the user wearing the AR glasses and an ambient sound of the user. An audio signal collected by the microphone 123 is transferred to the control unit 140.

The gyro sensor 124, the acceleration sensor 125, and the azimuth sensor 126 may be configured by an IMU. The sensor signals of the gyro sensor 124, the acceleration sensor 125, and the azimuth sensor 126 are transferred to the control unit 140. The control unit 140 can detect the position and posture of the head of the user wearing the AR glasses on the basis of these sensor signals.

The display unit 131 is configured by a transmission-type display (eyeglass lens or the like) installed in front of both eyes or one eye of the user wearing the AR glasses, and is used for display of a virtual world. Specifically, the display unit 131 expands the real space viewed from the user by displaying information (virtual object) or emphasizing, attenuating, or deleting a real object. The display unit 131 performs a display operation on the basis of a control signal from the control unit 140. Furthermore, a mechanism for see-through displaying the virtual object on the display unit 131 is not particularly limited.

The speaker 132 includes a single sounding element or an array of a plurality of sounding elements, and is installed in, for example, the AR glasses. From the speaker 132, for example, a sound related to the virtual object displayed on the display unit 131 is output, but other audio signals may be output.

The communication unit 134 has a wireless communication function such as Wi-Fi (registered trademark) or Bluetooth (registered trademark). The communication unit 134 mainly performs a communication operation for implementing data exchange between the control unit 140 and an external system (not illustrated).

The control unit 140 is installed in the AR glasses or arranged in a device (such as a smartphone) separated from the AR glasses together with the storage unit 150 and a driving power source such as a battery. The control unit 140 executes various programs read from the storage unit 150 to perform various types of processing.

Figure 6:
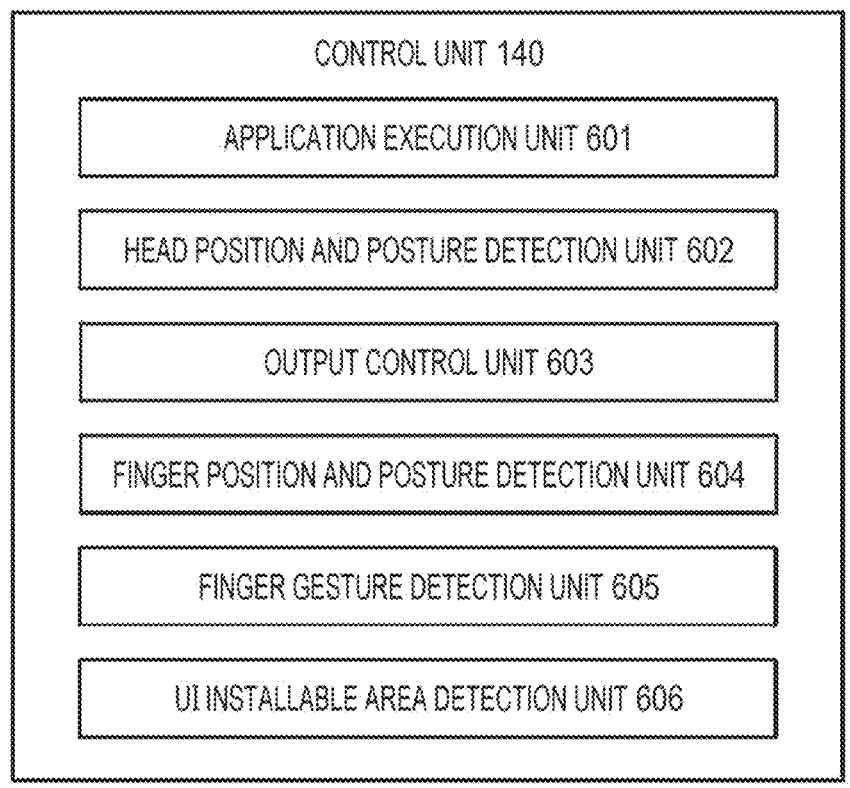
FIG. 6 is a diagram illustrating a functional configuration example provided in a control unit 140.

FIG. 6 schematically illustrates a functional configuration example provided in the control unit 140. In the illustrated example, the control unit 140 includes an application execution unit 601, a head position and posture detection unit 602, an output control unit 603, a finger position and posture detection unit 604, a finger gesture detection unit 605, and a UI installable area detection unit 606. These functional modules are implemented by the control unit 140 executing various programs read from the storage unit 150. Note that FIG. 6 illustrates only the minimum necessary functional modules for implementing the present disclosure, and the control unit 140 may further include other functional modules.

Figure 7:
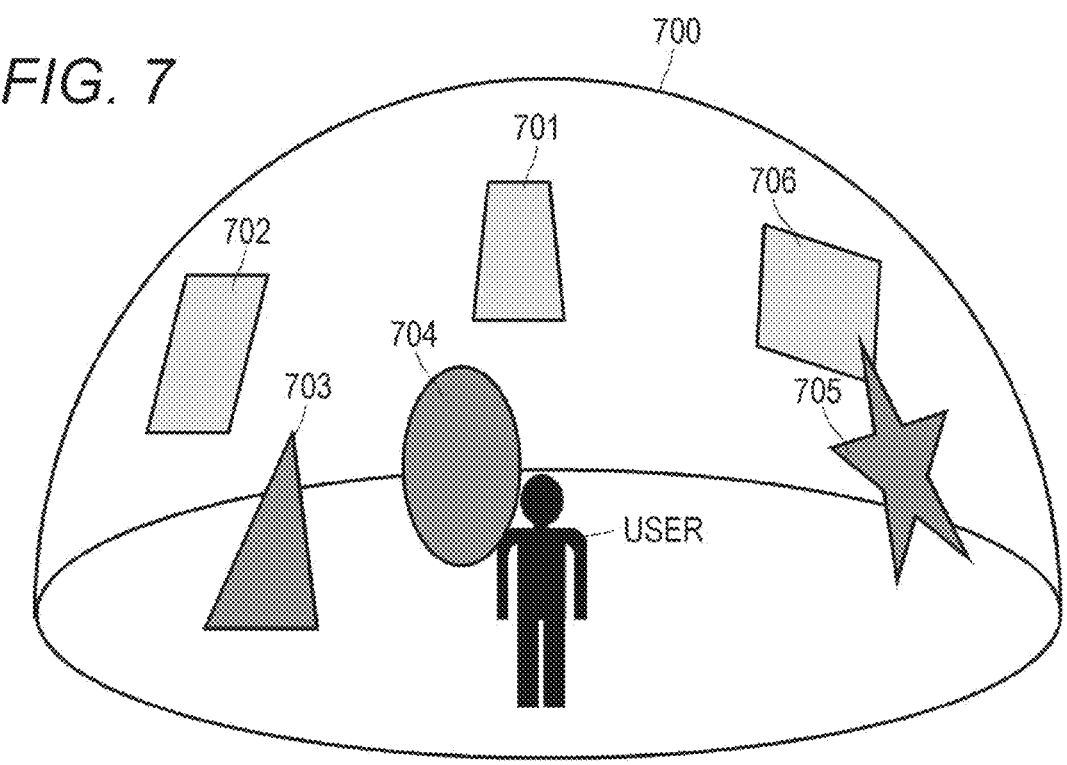
FIG. 7 is a diagram illustrating a state in which virtual objects are arranged around the user with the AR glasses worn on the head.

The application execution unit 601 executes an application program including the AR application under an execution environment provided by an OS. The application execution unit 601 may simultaneously execute a plurality of application programs in parallel. The AR application is, for example, an application such as moving image reproduction or a viewer of a 3D object, and superimposes and displays a virtual object in the field of view of the user wearing AR glasses (see FIG. 2) on the head, emphasizes or attenuates the specific real object, or deletes the specific real object to make it appear as if the specific real object does not exist. The application execution unit 601 also controls a display operation of the AR application (virtual object). The virtual object generated by the AR application is arranged over an entire periphery of the user. FIG. 7 schematically illustrates a state in which a plurality of virtual objects 701, 702, 703, and the like is arranged in a periphery 700 of the user wearing the AR glasses on the head. The application execution unit 601 arranges each of the virtual objects 701, 702, 703, and the like around the user with reference to the position of the head or a center of gravity of the body of the user estimated on the basis of the sensor information from the second sensor unit 120.

The head position and posture detection unit 602 detects the position and posture of the head of the user on the basis of the sensor signals of the gyro sensor 124, the acceleration sensor 125, and the azimuth sensor 126 included in the second sensor unit 120 mounted on the AR glasses, and further recognizes the line-of-sight direction or a field of view range of the user.

The output control unit 603 controls outputs of the display unit 131, the speaker 132, and the vibration presentation unit 133 on the basis of an execution result of the application program such as the AR application. For example, the output control unit 603 specifies the field of view range of the user on the basis of a detection result of the head position and posture detection unit 602, and controls the display operation of the virtual object by the display unit 131 so that the user can observe the virtual object arranged in the field of view range through the AR glasses, that is, so as to follow the movement of the head of the user.

Figure 8:
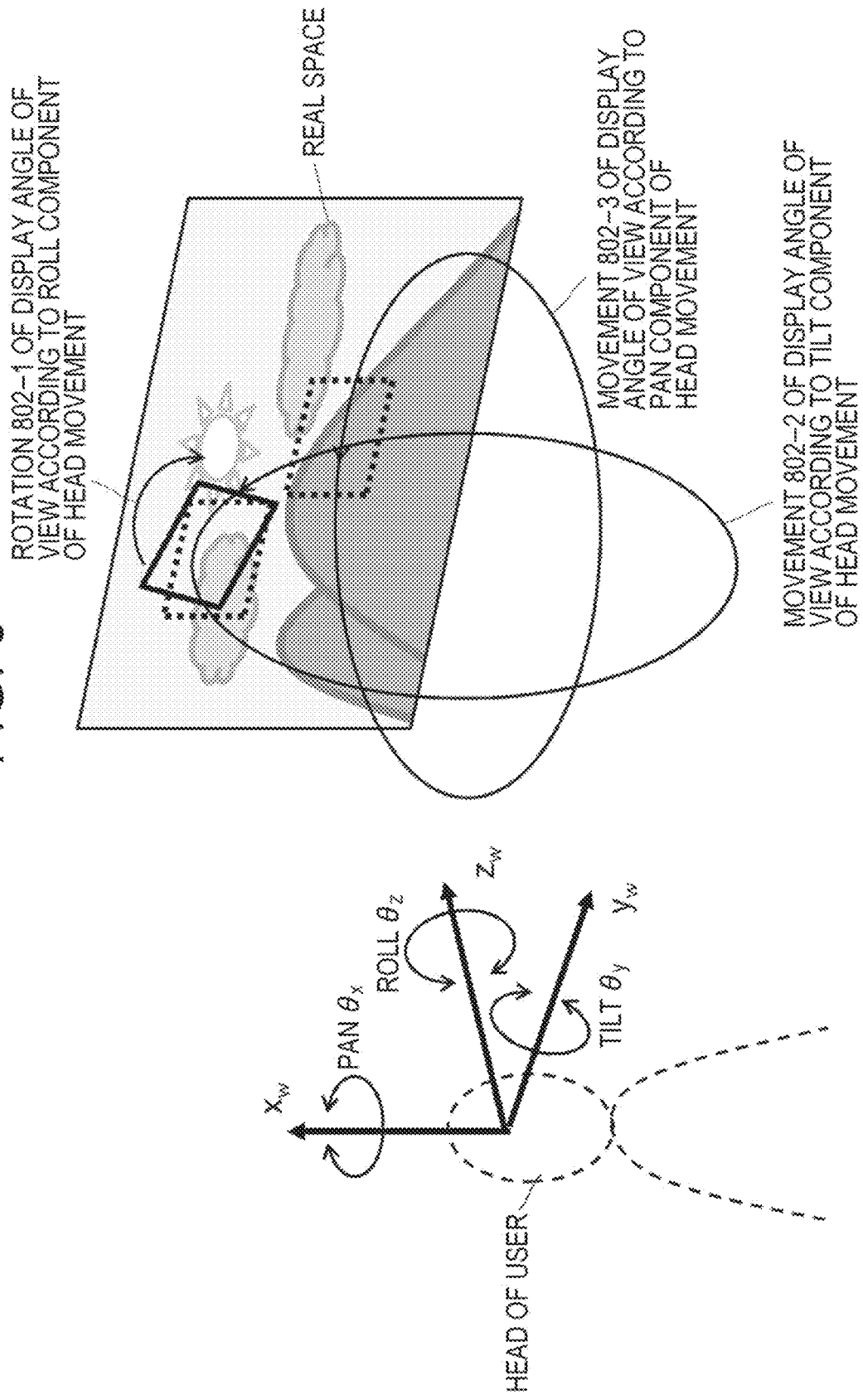
FIG. 8 is a diagram for describing a mechanism for displaying a virtual object so that the AR glasses follow movement of the head of the user.

The mechanism for displaying the virtual object so that the AR glasses follow the movement of the head of the user will be described with reference to FIG. 8. In FIG. 8, a depth direction of the line-of-sight of the user is a $z_w$ axis, a horizontal direction is a $y_w$ axis, and a vertical direction is an $x_w$ axis, and an origin position of a reference axis $x_w y_w z_w$ of the user is a viewpoint position of the user. A roll Oz corresponds to movement of the head of the user around the $z_w$ axis, a tilt $\theta_y$ corresponds to movement of the head of the user around the $y_w$ axis, and a pan $\theta_z$ corresponds to movement of the head of the user around the $x_w$ axis. The head position and posture detection unit 602 detects posture information including movement of the head of the user in each direction of roll, tilt, and pan ($\theta_z$, $\theta_y$, $\theta_z$) and translation of the head on the basis of sensor signals of the gyro sensor 124, the acceleration sensor 125, and the azimuth sensor 126. Then, the output control unit 603 moves a display angle of view of the display unit 131 in the real space (see, for example, FIG. 7) in which the virtual object is arranged so as to follow the posture of the head of the user, and displays an image of the virtual object existing in the display angle of view on the display unit 131. Specifically, the display angle of view is moved to cancel the movement of the head of the user by rotating an area 802-1 according to a roll component of the head movement of the user, moving an area 802-2 according to a tilt component of the head movement of the user, or moving an area 802-3 according to a pan component of the head movement of the user. Therefore, since the virtual object arranged at the display angle of view moved following the position and posture of the head of the user is displayed on the display unit 131, the user can observe the real space on which the virtual object is superimposed through the AR glasses.

The functional configuration of the control unit 140 will be described with reference to FIG. 6 again.

The finger position and posture detection unit 604 detects the positions and the postures of the hand and the finger of the user wearing the AR glasses on the basis of a recognition result of the image captured by the outward camera 121 or the detection signal of the first sensor unit 110. Furthermore, the finger gesture detection unit 605 detects the gesture of the finger of the user wearing the AR glasses on the basis of the recognition result of the image captured by the outward camera 121 or the detection signal of the first sensor unit 110. The gesture of the finger referred here includes the shape of the finger, specifically, angles of a third joint and the second joint of the index finger, the presence or absence of contact between the thumb and the fingertip of the index finger, and the like.

In the present embodiment, the finger position and posture detection unit 604 and the finger gesture detection unit 605 mainly detect the posture of the finger and the gesture of the finger with higher accuracy using information of the position and posture from the first sensor unit 110 (the gyro sensor 111, the acceleration sensor 112, and the azimuth sensor 113) attached to the hand of the user and a constraint condition of the position and posture that can be taken by the finger. For example, in a case where the user puts the hand behind the back side of the body such as the back or the buttock, the position and posture of the finger cannot be detected by the image recognition from the head, but the position and posture of the finger can be detected with high accuracy by using the sensor signal of the first sensor unit 110 attached to the hand. On the other hand, in the case of the method of detecting the position and posture of the finger and the gesture of the finger using the outward camera 121, there is a case where detection cannot be performed with high accuracy due to occlusion or the like.

The UI installable area detection unit 606 detects an area where a UI can be installed on the body of the user. The UI referred to here is specifically a UI in which the AR application executed by the application execution unit 601 is minimized. Furthermore, the UI installable area is, for example, the back, the waist, an arm, or the like of the user. The installation of the UI means that the UI is stored in association with the location of the UI installable area while holding the execution state of the AR application. The virtual object of the stored AR application disappears from the user's field of view.

Note that the UI installable area detection unit 606 may detect one UI installable area or may simultaneously detect a plurality of UI installable areas. In the case where a plurality of UI installable areas is detected, a UI in which another AR application is minimized can be stored in each UI installable area. Furthermore, the UIs of a plurality of AR applications may be stored in a duplicate manner in one UI installable area by selectively using a gesture of the finger instructing storage and restoration.

B. UI Installable Area

Conventionally, the user needs to close the AR application in order to make the obstructive AR application invisible from the field of view, and when the AR application is closed, the execution state of the AR application is discarded and the state returns to the initial state. In contrast, in the present embodiment, the user can designate a part on the body with the finger and store the UI in which the AR application is minimized in the designated part by a gesture motion of the specific finger. The virtual object of the AR application after being stored disappears from the user's field of view, but the minimized UI continues to hold the execution state of the AR application. Thereafter, the user can restore the original AR application from the minimized UI in the execution state before storage and cause the virtual object of the AR application to appear at the original location of the user's field of view by performing the gesture motion of the specific finger for restoring the UI with respect to the part on the body in which the UI is stored.

To implement the storage and restoration motion of the AR application, the UI installable area detection unit 606 detects an area where the UI can be installed on the body of the user. Furthermore, the application execution unit 601 specifies the AR application currently held by the user or the AR application specified by the user with the hand or the finger on the basis of the detection result of the finger position and posture detection unit 604. Then, when recognizing that the user has performed the gesture of the finger instructing storage of the AR application or restoration of the AR application in the UI installable area detected by the UI installable area detection unit 606 on the basis of the detection results of the finger position and posture detection unit 604 and the finger gesture detection unit 605, the application execution unit 601 stores the UI of the AR application in the part on the body designated by the gesture of the finger, or restores the AR application from the part on the body in which the UI is stored.

The UI installable area will be described in more detail. The head position and posture detection unit 602 can detect the position and posture of the head of the user with high accuracy on the basis of the detection signals of the gyro sensor 124, the acceleration sensor 125, and the azimuth sensor 126 included in the second sensor unit 120 mounted on the AR glasses. Therefore, the UI installable area detection unit 606 detects, as the UI installable area, a location obtained by adding a specific offset from the position of the head of the user as a reference or a part such as the back or the waist of the user.

Furthermore, since the first sensor unit 110 is also worn on the hand of the user, the position of the hand can be acquired from the gyro sensor 111, the acceleration sensor 112, and the azimuth sensor 113 included in the first sensor unit 110, and the position of the arm can be roughly estimated from the position of the hand. Therefore, the UI installable area detection unit 606 further detects the arm as the UI installable area. Of course, a location where the position is desired to be acquired may be made specifiable as the UI installable area by attaching a sensor (IMU or the like) to be tracked to the location.

Furthermore, even in a case where the sensor to be tracked is not directly attached to the location where the position is desired to be acquired, the UI installable area detection unit 606 may detect another part of the body that can be estimated using an inverse kinematics calculation technology as the UI installable area on the basis of the position and posture information of a detectable body part such as the position and posture of the hand detected from the sensor information of the first sensor unit 110 and the position and posture of the head detected from the sensor information of the second sensor unit 120.

Furthermore, the UI installable area detection unit 606 may detect another part of the body for which the position can be estimated using a machine learning model as the UI installable area on the basis of detectable body part information. The UI installable area detection unit 606 may use a machine learning model having undergone deep learning so as to estimate an optimal UI installable area on the basis of the sensor information from the first sensor unit 110 and the second sensor unit 120. For this machine learning model, for example, a loss function based on the number of failures of the finger operation of the user at the time of use or the like is defined, and the deep learning is performed by backward propagation so as to minimize the loss function.

Furthermore, the UI installable area detection unit 606 may determine the size and shape of the UI installable area as well as detecting the part to be the UI installable area from the body of the user. For example, the size of the area of the part that is difficult for the user to accurately operate with the fingers may be expanded on the basis of somatic sense, or the shape of the area that is easy for the user to accurately operate with the fingers may be set. The UI installable area detection unit 606 may use a machine learning model having undergone deep learning so as to estimate the size and shape of an optimal UI installable area on the basis of the sensor information from the first sensor unit 110 and the second sensor unit 120. For this machine learning model, for example, a loss function based on the number of failures of the finger operation of the user at the time of use or the like is defined, and the deep learning is performed by backward propagation so as to minimize the loss function.

Furthermore, the offset of the chest, abdomen, waist, buttock, or the like from the position of the head significantly varies depending on an individual difference of the user such as a body type. Therefore, the UI installable area detection unit 606 may estimate the size of the waistline or the like of the user on the basis of depth information of a depth sensor such as a TOF camera mounted on the AR glasses, estimate the position of each of the parts such as the chest, abdomen, waist, and buttock of the user (alternatively, estimate the offset from the position of the head to each part), and regard these parts as the UI installable areas.

Figure 9:
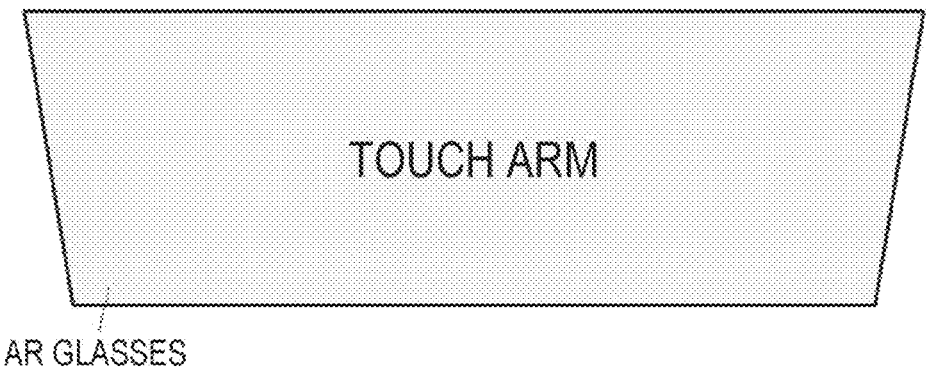
FIG. 9 is a diagram for describing a mechanism for detecting a UI settable area by calibration.
Figure 10:
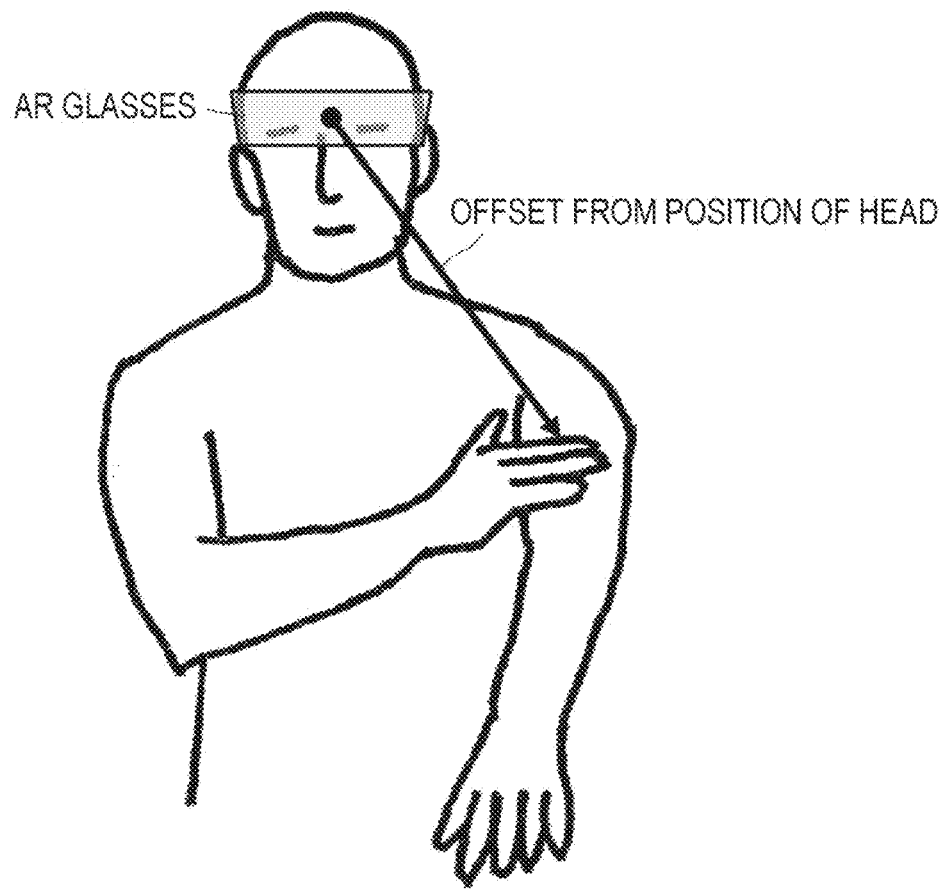
FIG. 10 is a diagram for describing a mechanism for detecting a UI settable area by calibration.

Furthermore, the UI settable area detection unit 606 may regard a location or a body part that can be specified by calibration as the UI installable area. For example, guidance that prompts the user to touch the waist, back, or arm at the time of calibration is output as a video of the display unit 131 or a sound of the speaker 132, and the position touched by the user according to the guidance is regarded as the UI installable area. For example, at the time of calibration, guidance saying "Please touch your arm" is displayed using the AR glasses as illustrated in FIG. 9. In response to the guidance, as illustrated in FIG. 10, when the user touches the arm according to the guidance, the UI installable area detection unit 606 detects the arm as the UI installable area if the position of the arm (alternatively, the offset of the position touched by the user from the position of the head) can be detected on the basis of the sensor information of the first sensor unit 110. Furthermore, since the waist or back is on the back of the torso and the user touches it in a blind way, the user cannot touch it as accurately as the position of the arm. Therefore, for the position of the waist or the position of the back of the user, a rough relative position from the position of the head of the user (alternatively from the position of the AR glasses) may be regarded as the UI installable area.

Since the length of the arm and a movable range of a joint also have individual differences, there is also an individual difference in the optimal position of the waist or back that the user can touch. Therefore, a different UI installable area may be set for each user from user's usual behavior of using the AR system 100 (or AR glasses), a result of a task additionally imposed on the user, or the like. Furthermore, the UI installable area of each part may be set from results of performing the above-described calibration a plurality of times for each part.

Note that body data used for the detection of the UI installable area and the like may be information obtained by not only measurement devices in the AR system 100 such as the first sensor unit 110 and the second sensor unit 120 but also a measurement device outside the AR system 100.

Furthermore, the UI installable area may be able to be customized for each user in addition to the UI installable area detection unit 606 automatically detecting the UI installable area. For example, the UI installable area detection unit 606 detects the UI installable area on the basis of the offset from the position of the head of the user (alternatively, the position of the AR glasses), but in a case where any of the limbs of the user is damaged, the user may not be able to perform a finger gesture such as touching or tapping on any of the automatically detected UI installable areas. In such a case, an unavailable UI installable area may be excluded at the user's hand (alternatively by manual operation).

C. Storage and Restoration Motion of AR Application

The AR system 100 according to the present embodiment can store the AR application in association with the location of the UI installable area while holding the execution state without closing the AR application. The virtual object of the stored AR application disappears from the user's field of view, but when the user performs the restoration motion, the virtual object of the AR application appears in the user's field of view in the execution state immediately before the storage. Specifically, the application execution unit 601 specifies the AR application currently held by the user or the AR application specified by the user with the hand or the finger on the basis of the detection result of the finger position and posture detection unit 604. Then, when recognizing that the user has performed the gesture of the finger instructing storage of the AR application or restoration of the AR application in the UI installable area detected by the UI installable area detection unit 606 on the basis of the detection results of the finger position and posture detection unit 604 and the finger gesture detection unit 605, the application execution unit 601 stores the UI of the AR application in the part on the body designated by the gesture of the finger, or restores the AR application from the part on the body in which the UI is stored.

The application execution unit 601 detects that the user's finger has approached or entered the UI installable area on the basis of the position and posture of the finger detected by the finger position and posture detection unit 604. In a case where granularity for estimating the body part that the user's finger approaches or touches cannot be made finer due to insufficient accuracy of the sensors of the gyro sensor 111, the acceleration sensor 112, and the azimuth sensor 113 used in the first sensor unit 110, the distance for determining that the finger has approached or entered the area may be increased. For example, when the gesture of the finger has occurred in the vicinity of the UI installable area, it is determined that the gesture has occurred in the UI installable area. There is a possibility that the position where the gesture of the finger has occurred is actually an original body part. Therefore, when the gesture of the finger has occurred in the vicinity of the body part set in the UI installable area, the position of the body part may be updated to the position where the gesture has occurred. Furthermore, in the case where finger can be captured by the outward camera 121, the finger position and posture detection unit 604 may detect the position and posture of the finger by a camera image of the outward camera 121.

Furthermore, the application execution unit 601 determines whether or not an instruction for the AR application or the virtual object thereof has been given on the basis of the gesture of the finger in the UI installable area detected by the finger gesture detection unit 605. The instruction referred to here includes storage and restoration of the UI of the AR application. Furthermore, the finger gesture detection unit 605 basically detects the shape of the finger, specifically, the angles of the third joint and the second joint of the index finger, and the presence or absence of contact between the thumb and the fingertip of the index finger. However, the finger gesture detection unit may further detect passage of the hand in the UI installable area, a motion to tap or pinch a body part serving as the UI installable area, and a motion of finger snapping in the UI installable area.

In the present embodiment, the application execution unit 601 uses the detection of the gesture of the finger in the UI installable area by the finger gesture detection unit 605 as a trigger for storing and restoring the UI of the AR application. Different finger gestures may be assigned to the storage of the UI of the AR application and the restoration of the stored AR application, or the same finger gesture may be assigned to both the storage and the restoration of the UI of the AR application. In the latter case, for example, the UI of the AR application is stored in the body part detected as the UI installable area by a motion of tapping the body part with the hand, and the UI of the AR application is restored from the body part when the body part in which the UI of the AR application is already stored is tapped again.

Figure 11:
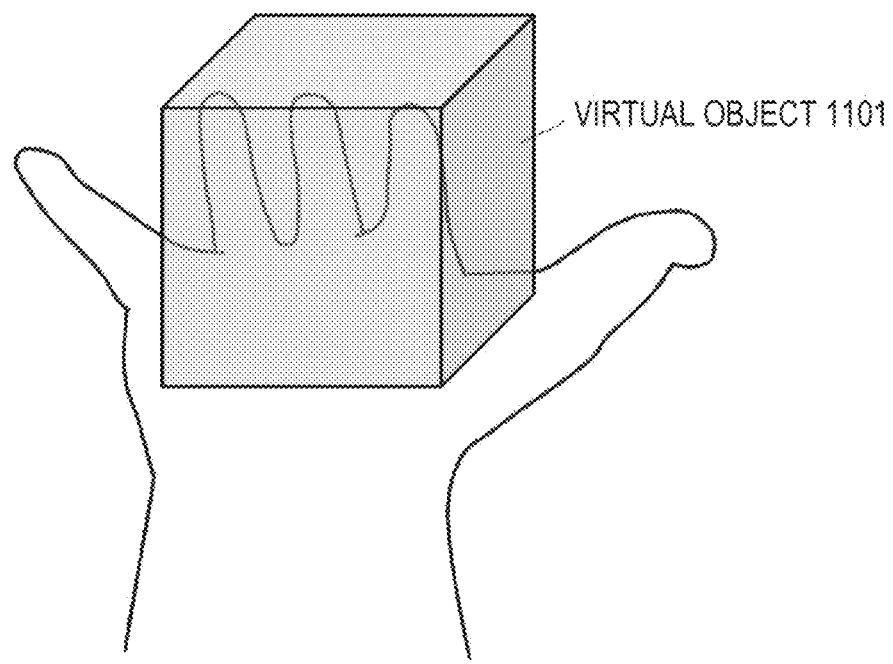
FIG. 11 is a diagram illustrating storage and restoration motion of a UI of an AR application.
Figure 12:
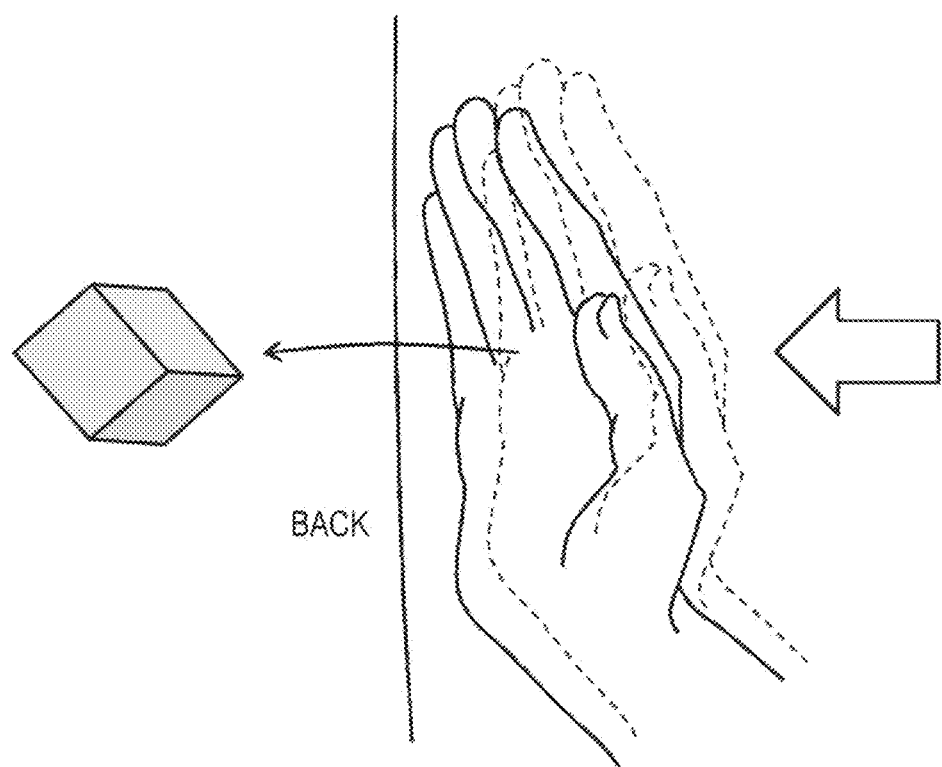
FIG. 12 is a diagram illustrating storage and restoration motion of the UI of the AR application.

For example, as illustrated in FIG. 11, it is assumed that a virtual object 1100 of the AR application being executed by the application execution unit 601 appears on the palm of the user. When the virtual object 1100 becomes obstructive, the user can store the UI of the AR application in the UI installable area while maintaining the execution state of the AR application by performing a predetermined gesture on the UI installable area on the user's body with his/her hand. The predetermined finger gesture may be, for example, a motion of tapping the UI installable area. Furthermore, the UI installable area may be the back. FIG. 12 illustrates a motion example in which the user taps the body part (for example, the back) with the palm to store the UI of the AR application. The application execution unit 601 holds the execution state of the AR application in association with the body part where the predetermined finger gesture instructing the storage of the UI of the AR application has been performed, and causes the display of the virtual object 1100 to disappear.

Although not illustrated in FIGS. 11 and 12, it is assumed that a controller 500 as illustrated in FIG. 5 is worn on the hand of the user. Furthermore, when the storage of the UI of the AR application is completed, the application execution unit 601 may give feedback to the user by operating the vibration presentation unit 133, displaying a message notifying completion on the display unit 131, or emitting a warning sound from the speaker 132.

Figure 13:
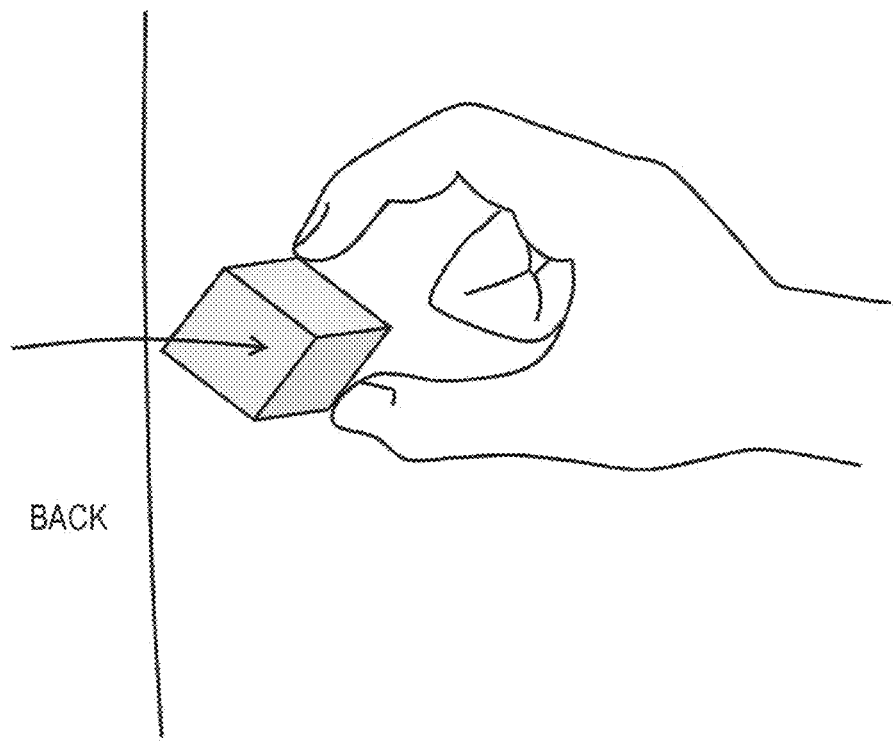
FIG. 13 is a diagram illustrating storage and restoration motion of the UI of the AR application.

Thereafter, when the user wants to use the AR application again, the user performs a predetermined finger gesture on the body part where the UI of the AR application is stored in order to instruct restoration of the AR application. The gesture instructing restoration of the AR application may be the same as or different from the gesture instructing storage of the AR application. FIG. 13 illustrates a motion example in which the user restores the UI of the AR application by a gesture of picking out the UI of the AR application with the thumb and the index finger from the body part (for example, the back) in which the UI of the AR application is stored. Alternatively, similarly to FIG. 12, the UI of the AR application may be restored by the gesture of tapping the body part (for example, the back) in which the UI of the AR application is stored with the palm. The application execution unit 601 restores, in the original execution state, the AR application held in association with the body part where the predetermined finger gesture instructing restoration of the AR application has been performed. Then, as illustrated in FIG. 14, the application execution unit 601 reproduces the virtual object of the restored AR application on the palm of the user.

Figure 14:
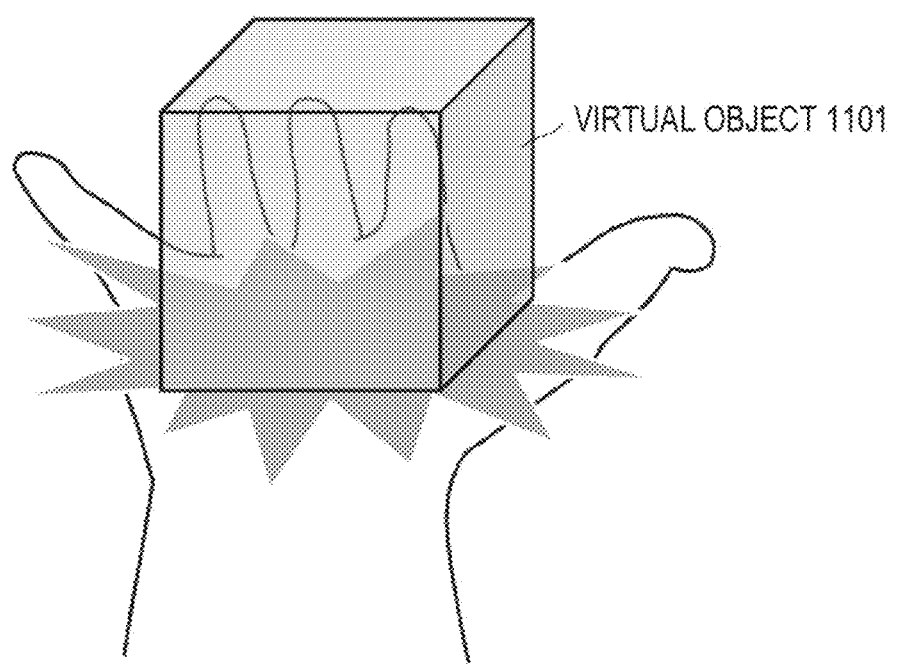
FIG. 14 is a diagram illustrating storage and restoration motion of the UI of the AR application.

Although not illustrated in FIGS. 13 and 14, it is assumed that the controller 500 as illustrated in FIG. 5 is worn on the hand of the user. Furthermore, when the restoration of the UI of the AR application is completed, the application execution unit 601 may give feedback to the user by operating the vibration presentation unit 133, displaying a message notifying completion on the display unit 131, or outputting a sound of announcement notifying completion from the speaker 132.

Note that, in the examples illustrated in FIGS. 11 to 12, the user holds the UI (virtual object) of the AR application to be stored in the hand (or placed on the palm), but does not need to directly hold the target virtual object in the hand. For example, after pointing the target virtual object with a finger, the user may perform the predetermined finger gesture for storing the virtual object in the body part.

In the present embodiment, the motion to store the UI of the AR application in the body part or restore the UI from the body part is similar to a motion to minimize the application on the screen and store the application in a task bar or open the minimized application in the task bar in a general OS from the viewpoint of minimizing the digital information. On the screen of the general OS, the application that is temporarily obstructive is minimized and stored in the task bar. In contrast, in the present disclosure, the UI of the AR application that is temporarily obstructive is stored in, for example, the part detected as the UI installable area on the body of the user.

Furthermore, the motion to store the UI of the AR application in the body part and restore the UI of the AR application from the body part is also similar to a motion that a worker takes in and out a tool of a tool holder attached to the waist or a hairstylist takes in and out scissors of a scissor case attached to the waist from the viewpoint of storing an object in the body part. The hairstylist returns the used scissors to the scissor case at a waist position, and takes out the scissors to be used next out of the scissor case. In contrast, in the present disclosure, the UI of the AR application that is temporarily obstructive can be stored in the body part detected as the UI installable area, or the stored UI of the AR application can be restored from the body part. Since the hairstylist has a somatic sense, the hairstylist can stretch his/her hand and take in and out the scissors of the scissor case almost accurately without moving the line-of-sight. Also in the present disclosure, the user can perform the motion to store the UI of the AR application in the body part serving as the UI installable area and take out the UI of the AR application of the body part and restore the UI without moving the line-of-sight by the somatic sense.

Figure 16:
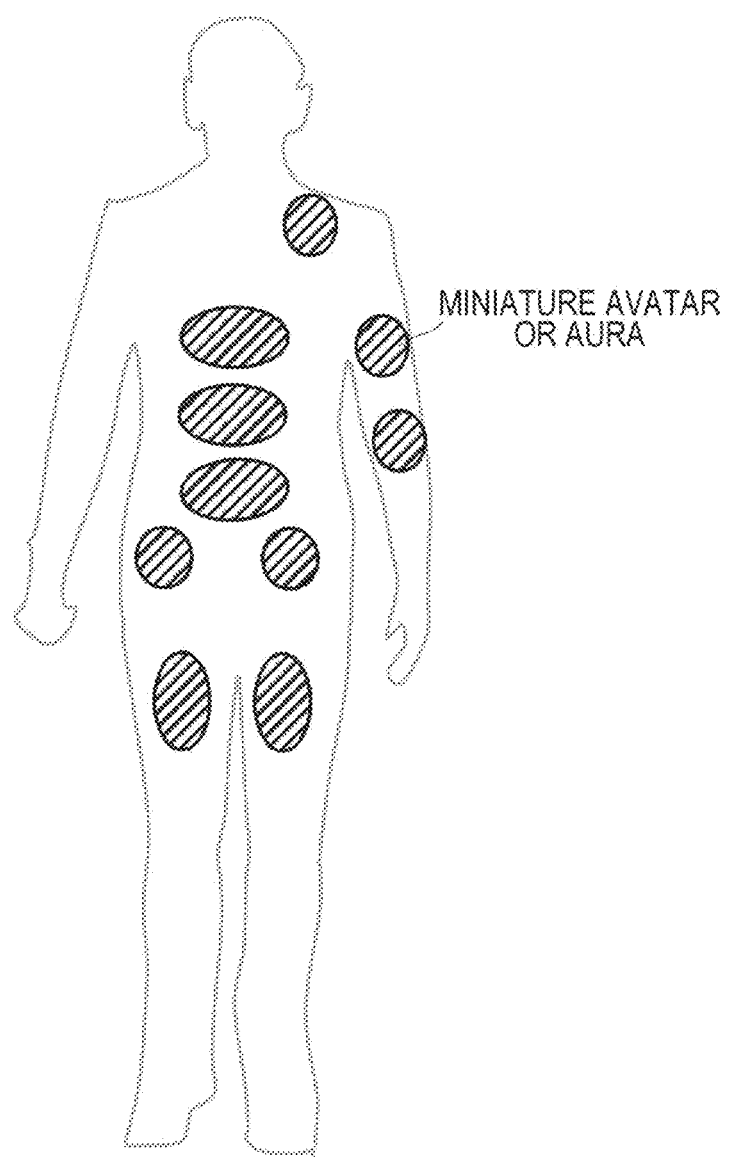
FIG. 16 is a diagram illustrating an example of displaying auras of UI installable areas on a body of the user.

Note that it may be difficult for the user to understand which part on the body is detected as the UI installable area by the UI installable area detection unit 606, that is, which part on the body the UI of the AR application can be stored. A user having an experience of using the AR system 100 may remember which part of his/her body is the UI installable area, but a beginner may not know at all. Therefore, the application execution unit 601 may display a virtual object such as a miniature avatar or an aura in the UI installable area so that the user can easily visually understand the UI installable area. FIG. 16 illustrates an example of displaying auras of the UI installable areas on the body of the user. Note that the UI installable area illustrated in FIG. 16 is an example and is not limited to the example. Furthermore, the method of displaying a miniature avatar or an aura is not particularly limited.

The application execution unit 601 may store the UIs of a plurality of AR applications in individual UI installable areas according to a predetermined finger gesture of the user. This case is based on the premise that the UI installable area detection unit 606 has detected a plurality of UI installable areas from the user's body. In other words, it is allowed to store the UI of the AR application one by one in each UI installable area. When the user tries to store the UI of the AR application in an overlapping manner by performing a predetermined finger gesture in the UI installable area in which the UI is already stored, the application execution unit 601 may feedback to the user that the UI cannot be stored in the location by operating the vibration presentation unit 133, displaying a warning message on the display unit 131, or emitting a warning sound from the speaker 132.

Furthermore, the application execution unit 601 may store the UIs of a plurality of AR applications in one UI installable area in an overlapping manner. In this case, the AR application may be specified using a different finger gesture for each AR application. However, it is difficult for the user to properly use a plurality of finger gestures. Therefore, when the user performs a predetermined finger gesture on the location where the UIs of a plurality of AR applications are stored, the application execution unit 601 may display a list of the AR applications stored in the location so that the user can select the AR application by pointing, a voice command, or the like. Alternatively, the application execution unit 601 may restore the UI of the AR application by the first-in first-out method or the first-in last-out method when the user performs a predetermined finger gesture on the location where the UIs of the plurality of AR applications are stored.

Figure 15:
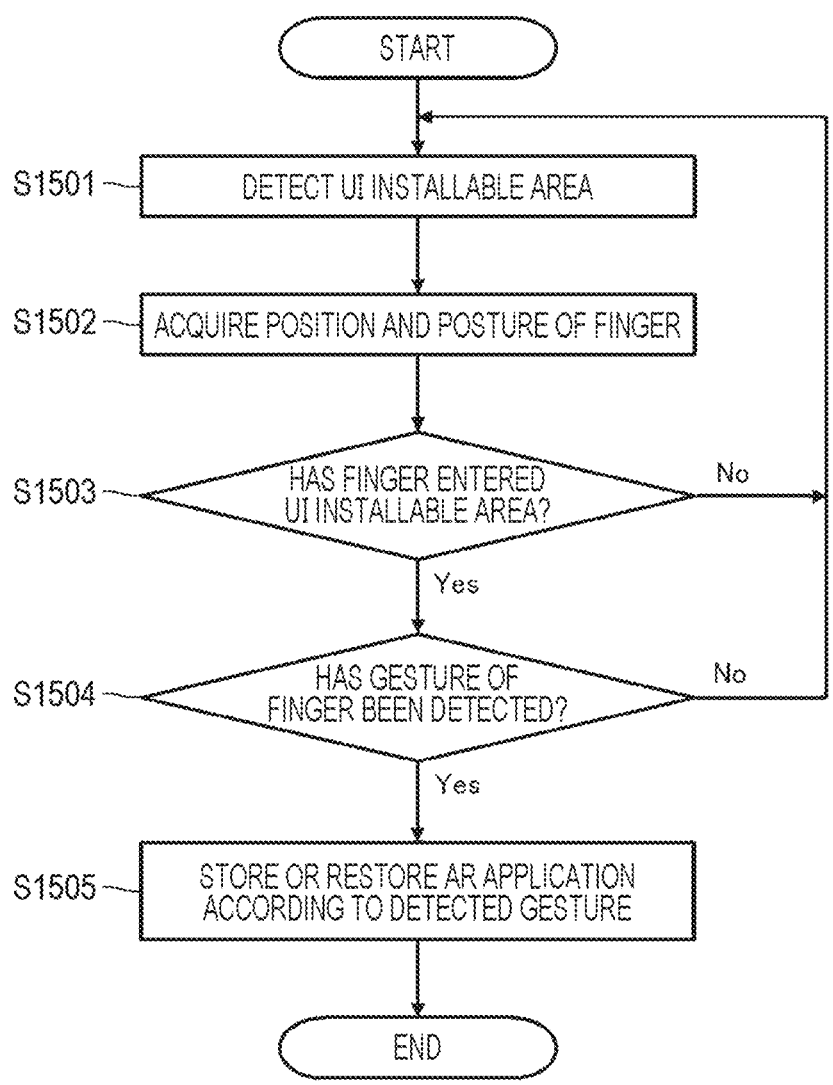
FIG. 15 is a flowchart illustrating an operation procedure of storing and restoring the AR application.

FIG. 15 illustrates an operation procedure of storing and restoring the AR application in the AR system 100 in the form of a flowchart.

First, the UI installable area detection unit 606 detects the UI installable area from the part of the body of the user or the like (step S1501). The UI installable area detection unit 606 detects, as the UI installable area, the location obtained by adding a specific offset from the position of the head of the user as a reference or the part such as the back or waist of the user, for example. Since the method of detecting the UI installable area has already been described, details are omitted here.

Next, the finger position and posture detection unit 604 acquires the position and posture of the user's finger (step S1502). Basically, the finger position and posture detection unit 604 acquires the position and posture of the finger of the user wearing the controller 500 (alternatively, the first sensor unit 110) as illustrated in FIG. 5. Note that the finger position and posture detection unit 604 may detect the position and posture of the finger by a camera image of the outward camera 121.

The application execution unit 601 monitors whether or not the user's finger has approached or entered the UI installable area on the basis of the position and posture of the finger detected by the finger position and posture detection unit 604 (step S1503). In a case where a plurality of UI installable areas is detected in step S1501, the application execution unit 601 monitors whether or not the user's finger has approached or entered any of the UI installable areas.

When detecting that the user's finger has approached or entered the UI installable area (Yes in step S1503), the application execution unit 601 subsequently monitors the finger gesture detected in the UI installable area by the finger gesture detection unit 605 (step S1504). The finger gesture detection unit 605 basically detects the shape of the finger, specifically, the angles of the third joint and the second joint of the index finger, and the presence or absence of contact between the thumb and the fingertip of the index finger. However, the finger gesture detection unit may further detect passage of the hand in the UI installable area, the motion to tap or pinch a body part serving as the UI installable area, and the motion of finger snapping in the UI installable area.

Then, when detecting that the finger gesture instructing storage or restoration of the UI of the AR application has been performed in the UI installable area (Yes in step S1504), the application execution unit 601 stores or restores the UI of the AR application according to the instruction by the finger gesture (step S1505).

Here, in the case where storage of the UI of the AR application is instructed, the user holds the UI (virtual object) of the AR application to be stored in the hand (or placed on the palm) (see, for example, FIGS. 11 and 12). Note that the user does not necessarily directly hold the UI of the AR application to be stored in the hand. For example, the user may point to the UI of the AR application desired to be stored with a finger, and the application execution unit 601 may specify the AR application pointed by the user on the basis of the detection result of the finger position and posture detection unit 604 and store the UI of the AR application in the UI installable area detected in step S1503.

D. Separate Display of AR Application

The application execution unit 601 executes the application program including the AR application under the execution environment provided by an OS, and controls a display operation of the AR application (virtual object). The virtual object is arranged at an arbitrary location in the real space. FIGS. 11 and 14 illustrate examples in which the AR application is placed in a range that the user can reach, that is, on the palm of the user for convenience of description, but it is also assumed that the virtual object is arranged in a distance that the user cannot reach.

The user can operate the AR application arranged in the range that the user can reach by hand, and the application execution unit 601 can estimate an operation that the user has manually performed on the AR application on the basis of the position where the AR application is arranged and the detection results of the finger position and posture detection unit 604 and the finger gesture detection unit 605. On the other hand, it is not possible to directly operate the AR application placed far out of reach by hand.

Therefore, in the present embodiment, an operation application for operating the AR application, such as a remote controller for remotely operating a device, is arranged at hand of the user, and the AR application arranged far out of reach is operated using an operation application. The application execution unit 601 can estimate the operation that the user has performed on the operation application on the basis of the position where the operation application is arranged and the detection results of the finger position and posture detection unit 604 and the finger gesture detection unit 605. Then, the application execution unit 601 controls the operation of the AR application arranged far away on the basis of content of the operation performed for the operation application by the user. The operation application includes an operation UI for operating the target AR application.

The operation application is one of AR applications. The application execution unit 601 executes the operation application and displays the virtual object including the operation UI at hand of the user. The hand of the user is, for example, a location obtained by adding a specific offset from the position of the head of the user as a reference, or the palm or the back of the hand, or the like of the user.

Figure 17:
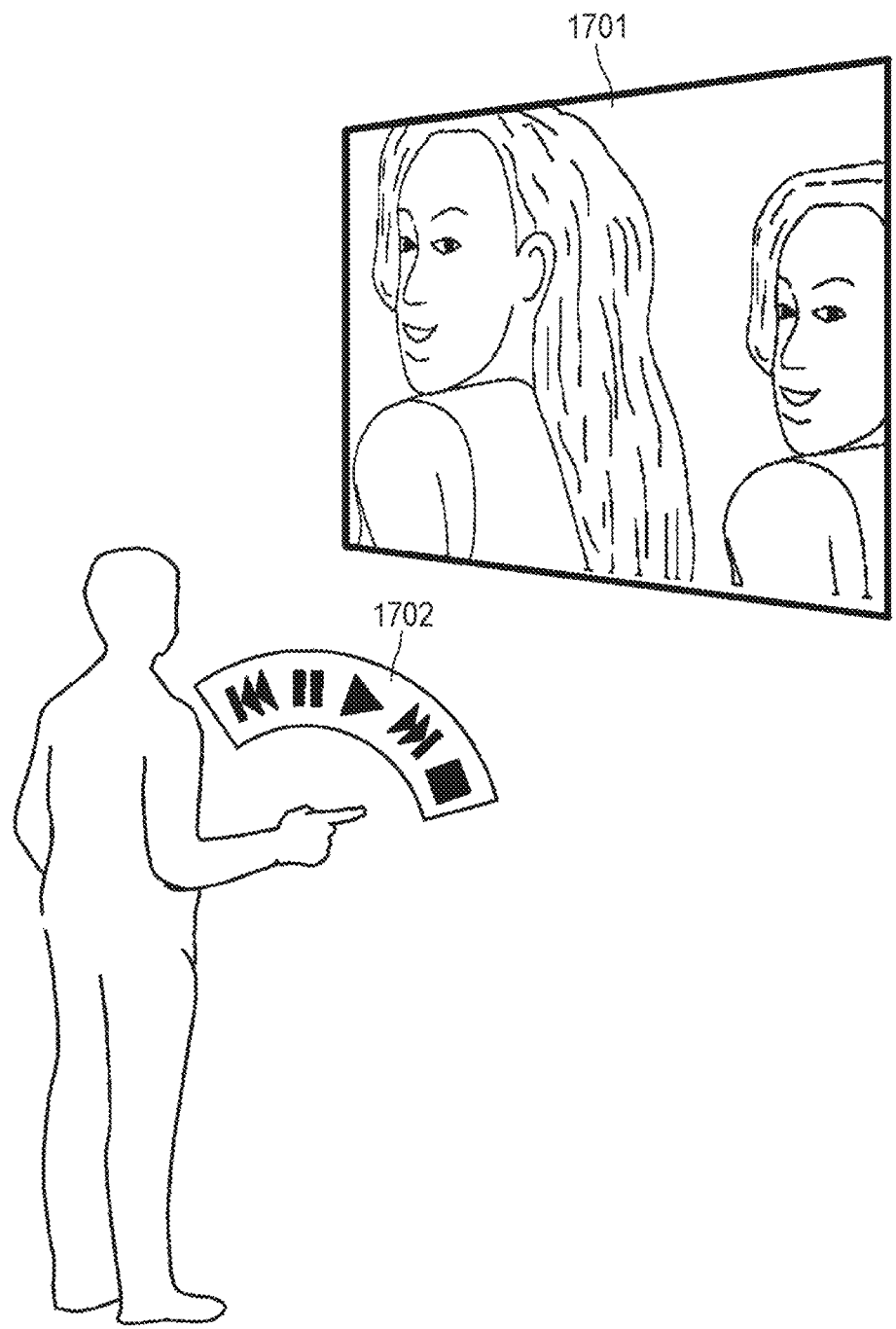
FIG. 17 is a diagram illustrating an example of displaying a virtual object of an operation UI at hand of the user, the operation UI for operating the AR application arranged far away.

The operation application displays the operation UI differently depending on the AR application to be operated. For example, in the case of the AR application for moving image reproduction, the operation UI requires a UI component for instructing an operation related to content reproduction such as reproduction, pause, fast forwarding, rewinding, and repeated reproduction. Meanwhile, in the case of the AR application for race game, a UI component for instructing an operation such as an accelerator, a brake, and a steering wheel is necessary. FIG. 17 illustrates a state in which an operation UI 1702 including UI components for content reproduction operation is displayed at hand of the user viewing an AR application 1701 for moving image reproduction. Both the AR application 1701 for moving image reproduction and the operation UI 1702 are virtual objects displayed in the real space, and the user can observe them through AR glasses. When the user is viewing moving image content of the AR application 1701 displayed in a location where the user cannot reach, the user can perform a content reproduction operation by using buttons of reproduction, pause, fast forwarding, rewinding, and repeated reproduction included in the operation UI 1702 at hand.

As illustrated in FIG. 17, by arranging the operation application near the user, the user can operate the AR application arranged far out of reach. However, even if the operation application is arranged nearby, there is a problem that the user does not know which button is located at which position and cannot accurately operate the operation application unless the user looks at his/her hand. Therefore, all or some of functions (alternatively, the UI components) for operating the AR application to be operated may be directly arranged on the hand of the user. Since the user can know which button is located at which position by a somatic sense, the user can accurately operate the operation UI without removing the line-of-sight from the AR application (for example, moving image reproduction). Of course, the operation UI may be arranged in a body part other than the hand, in which the user can accurately grasp the position of the button by a somatic sense. In the above section C, the example in which the UI of the AR application is stored in a body part (UI settable area) of the user has been described, but in this section D, a part or all of the functions of the AR application are arranged in a body part of the user.

For example, all or some of the operation UIs are arranged on the left palm of the user, and are operated with the right hand wearing the controller 500 (see FIG. 5). The application execution unit 601 arranges the operation UIs on the left palm of the user, the position and posture of which are recognized from the captured image of the outward camera 121, for example. The user can view the operation UIs displayed on the user's palm through the AR glasses and operate a desired operation UI with the right hand. Then, when recognizing that the user's right hand is in the vicinity of the left palm on the basis of the detection result of the finger position and posture detection unit 604 and further recognizing that any button arranged on the left palm has been operated on the basis of the detection result of the finger gesture detection unit 605, the application execution unit 601 executes the operation of the AR application instructed by the button. For example, the application execution unit 601 starts reproduction of moving image content when recognizing the operation of pressing the reproduction button by the user while executing the AR application for moving image reproduction, and fast-forwards the content when recognizing the operation of pressing fast-forwarding.

Figure 18:
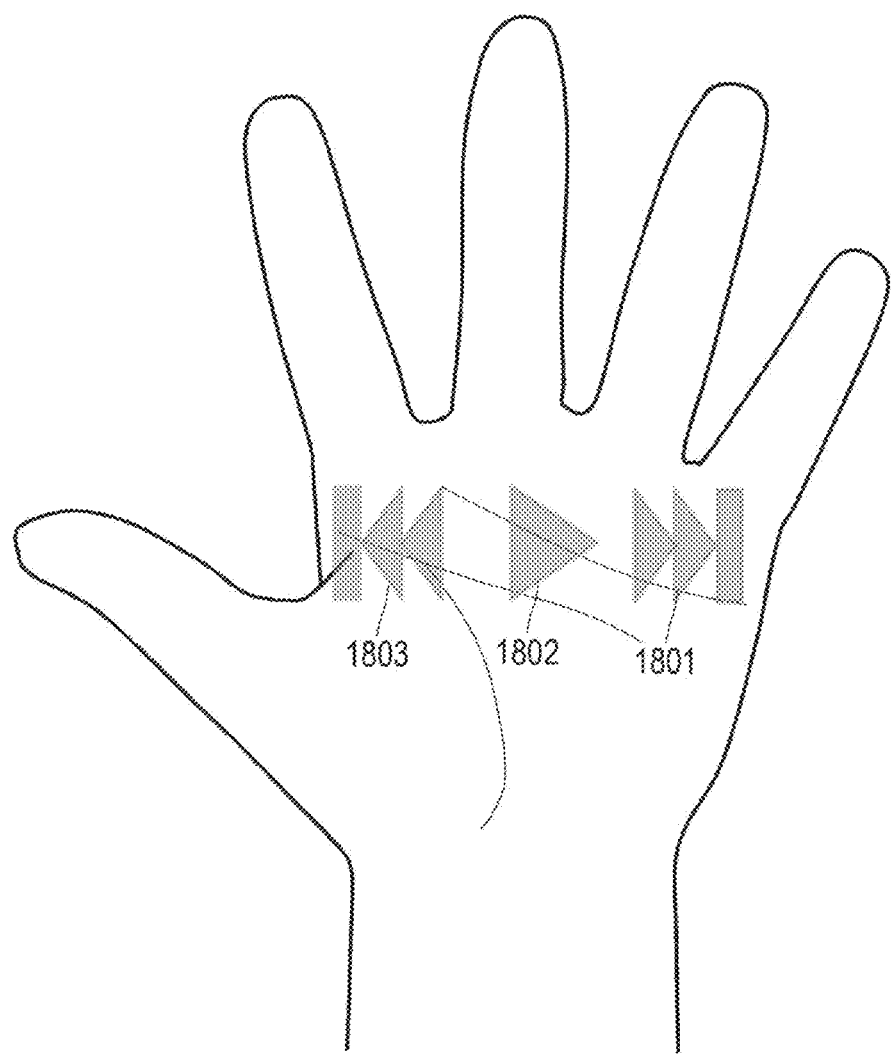
FIG. 18 is a diagram illustrating an example of displaying a virtual object of the operation UI on a palm of the user.
Figure 19:
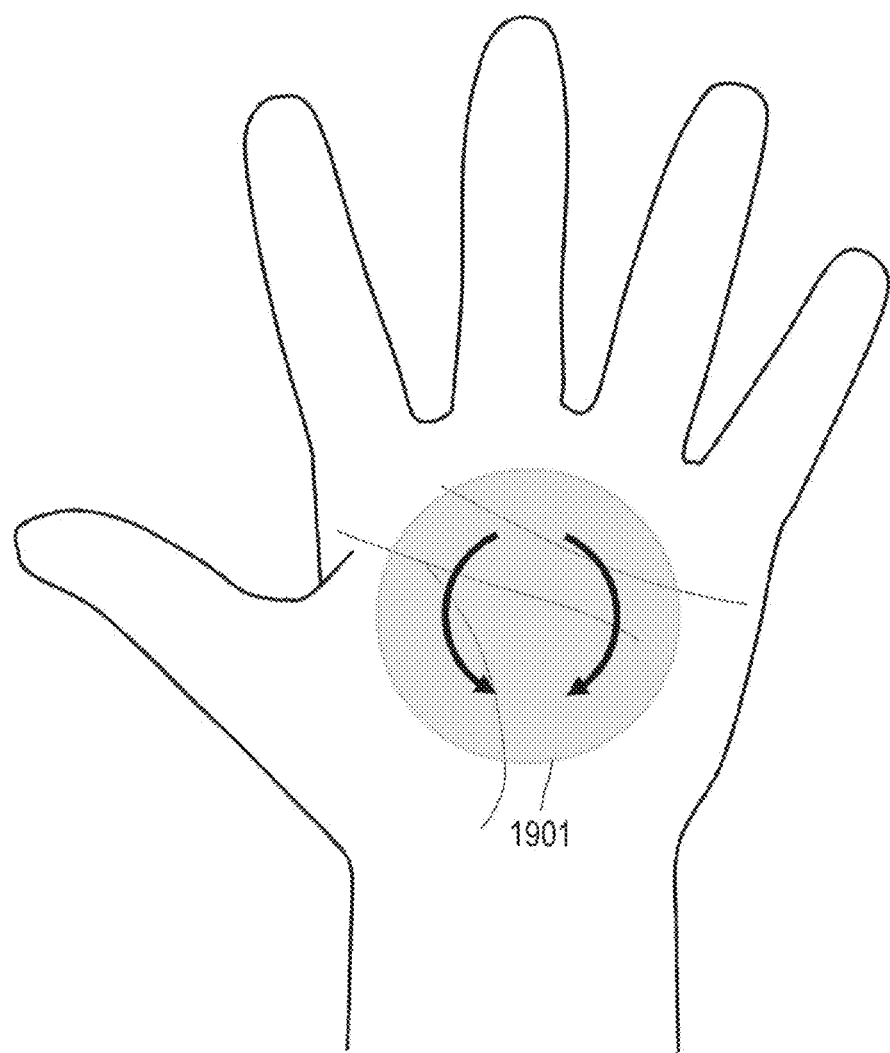
FIG. 19 is a diagram illustrating an example of displaying a virtual object of the operation UI on a palm of the user.

FIG. 18 illustrates an example in which virtual objects 1801 to 1803 of the operation UI for content reproduction such as reproduction, fast-forwarding, and rewinding are displayed on the left palm of the user. Furthermore, FIG. 19 illustrates an example in which a virtual object 1901 of a jog controller for instructing frame feeding in forward direction or backward direction by rotation is displayed on the left palm of the user as the operation UI for content reproduction. In any of the examples illustrated in FIGS. 18 and 19, the application execution unit 601 arranges the virtual objects of the operation UIs 1801 to 1803 or 1901 on the left palm of the user, the position and posture of which are recognized from the captured image of the outward camera 121, for example. The user can view the operation UIs 1801 to 1803 or 1901 displayed on the palm of the user through the AR glasses. Then, when recognizing that the user's right hand is in the vicinity of the left palm on the basis of the detection result of the finger position and posture detection unit 604 and further recognizing an operation amount for the operation UI arranged on the left palm on the basis of the detection result of the finger gesture detection unit 605, the application execution unit 601 executes the operation of the AR application such as reproduction, fast-forwarding, rewinding, or frame feeding of the reproduced content according to the operation amount.

Figure 20:
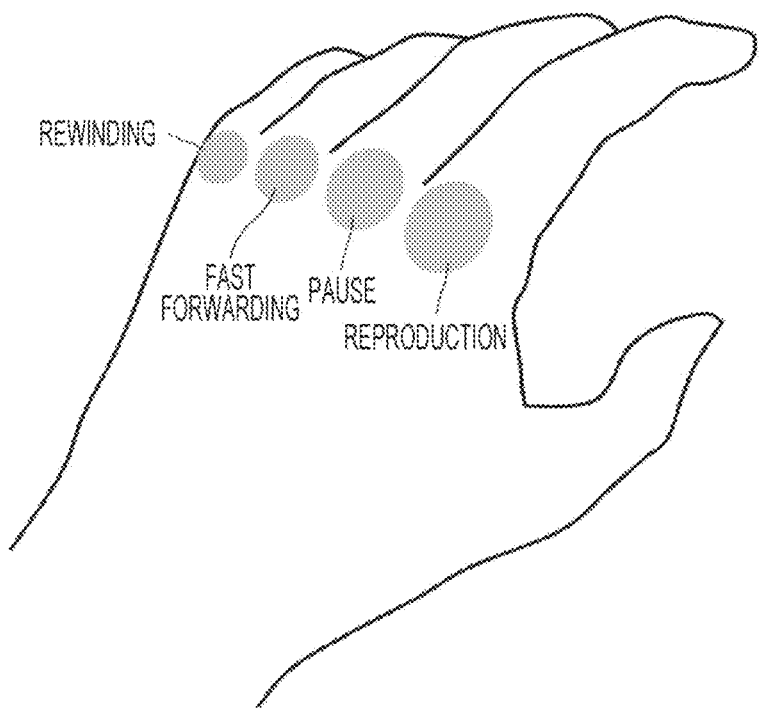
FIG. 20 is a diagram illustrating an example of assigning functions of the AR application to the back of the hand of the user.

Furthermore, a function to operate the AR application may be arranged on the back of the hand instead of the palm of the user. While the palm is substantially flat, the back of the hand has a characteristic shape having a convex portion due to the metacarpal head in each of the index finger, the middle finger, the ring finger, and the little finger. Therefore, as illustrated in FIG. 20, functions to operate the AR application such as reproduction, pause, fast forwarding, and rewinding may be individually assigned to the four convex portions of the index finger, the middle finger, the ring finger, and the little finger of the left hand. The user can touch the convex portion of each finger with the right hand by a somatic sense without directly looking at the back of the left hand. For example, the application execution unit 601 assigns the functions of reproduction, pause, fast forwarding, and rewinding to the four convex portions on the back of the left hand of the user, the position and posture of which are recognized from the captured image of the outward camera 121, but does not need to arrange virtual objects. The user touches any convex portion of the back of the left hand without directly looking at the left palm to perform the operation for the AR application. Then, when recognizing that the user's right hand is in the vicinity of the back of the left hand on the basis of the detection result of the finger position and posture detection unit 604 and further recognizing that the user has touched any of the convex portions of the back of the left hand with the finger of the right hand on the basis of the detection result of the finger gesture detection unit 605, the application execution unit 601 executes the operation of the AR application such as reproduction, fast-forwarding, rewinding, or frame feeding of the reproduction content according to the function assigned to the convex portion.

In the AR system 100, as illustrated in FIGS. 17 to 20, to enable arrangement of the operation UI of the AR application separately from the virtual object of the AR application main body, information necessary for making the operation UI separable is held by the AR application or held in association with the AR application. Furthermore, when the operation UI is arranged on the user's hand such as the left palm or the back of the hand of the user, the number of placeable metacarpal heads or the like may be limited. For this reason, information that enables determination of the operation UI to be preferentially arranged on the user's hand, such as determination of priority order among a plurality of operation UIs, is also held by the AR application or held in association with the AR application.

Furthermore, in the case of arranging the operation unit of the AR application at hand of the user separately from the virtual object of the AR application main body, a rule is determined such that an area where the operation unit can be arranged is set within a certain distance from the position of the AR glasses (or the second sensor unit 120). As a result, it is ensured that the finger position and posture detection unit 604 and the finger gesture detection unit 605 can detect the position and posture and the gesture of the finger of the user who performs the operation for the operation unit, and the application execution unit 601 can operate the AR application on the basis of the operation of the finger of the user for the operation unit.

It is also possible to recognize the operation of the finger of the user performed for the operation unit arranged on the user's hand, the user's palm, or the back of the hand through the captured image of the outward camera 121. For this configuration, in the present embodiment, since the first sensor unit 110 is attached to the hand (right hand) of the user who performs the operation, even in a case where occlusion occurs in the field of view of the outward camera 121, the operation of the user's finger performed for the operation unit can be detected with high accuracy on the basis of the sensor information from the first sensor unit 110.

Furthermore, in a case where the detection accuracy of the finger position and posture detection unit 604 is not sufficient, the application execution unit 601 may make it easier for the user to operate the operation unit by expanding the size of the area to which one operation is assigned (for example, the reproduction button is enlarged) or simplifying the shape of the operation UI displayed as a virtual object. For example, the application execution unit 601 may determine the size and shape of the operation UI using a machine learning model that estimates optimum size and shape of the operation UI for the AR application. For this machine learning model, for example, a loss function based on the number of failures of the finger operation of the user at the time of use or the like is defined, and the deep learning is performed by backward propagation so as to minimize the loss function.

E. Arrangement of Operation UI

In the above section D, the example in which the operation UI of the AR application is arranged separately from the virtual object of the AR application main body has been described, and the optimization of the size and shape of the operation UI has also been described.

As illustrated in FIG. 20, in the case of arranging the operation UI using the features of the body part such as the metacarpal head, the user can accurately operate the operation UI by a somatic sense without directly looking at his/her body part. Furthermore, in the case of arranging a button, a menu, or the like on the body part having no characteristic shape such as the back or the palm, the user can accurately operate the operation UI by optimizing the size and shape of each button so as not to cause an operation error.

Meanwhile, in a case of arranging the operation UI for performing a coordinate input on the body part, there is a concern that an erroneous input may occur due to a relative position between the operation UI and the finger of the user who operates the operation UI.

Figure 21:
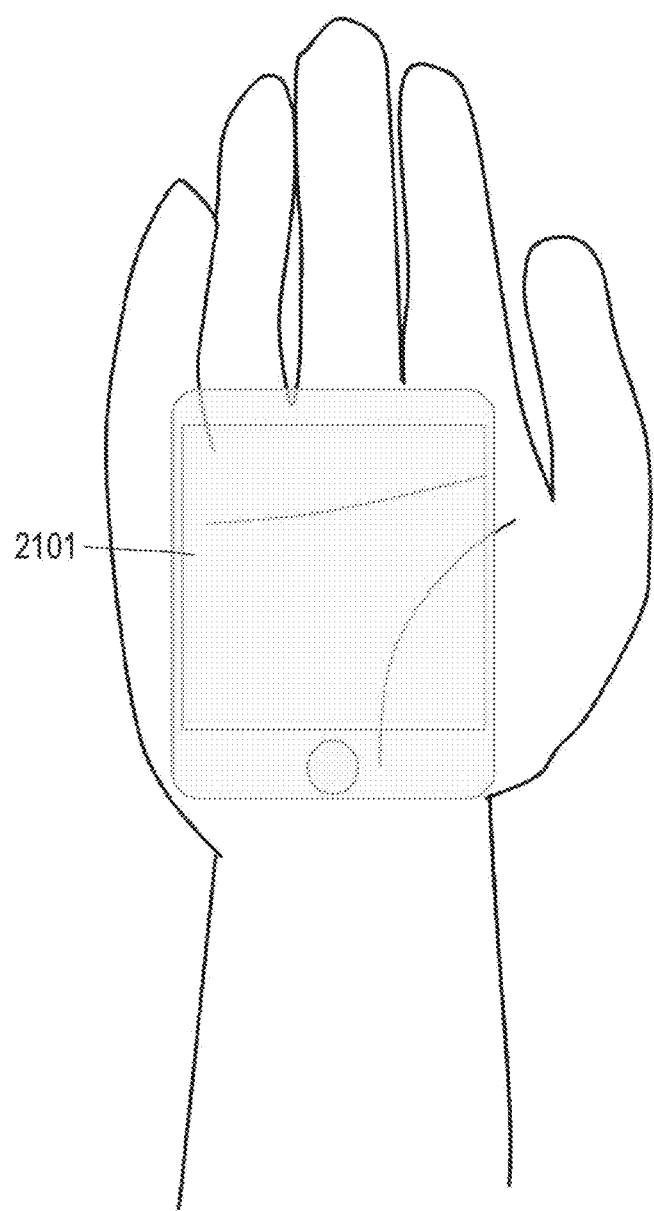
FIG. 21 is a diagram illustrating an example of arranging the operation UI for performing a coordinate input on a palm.
Figure 22:
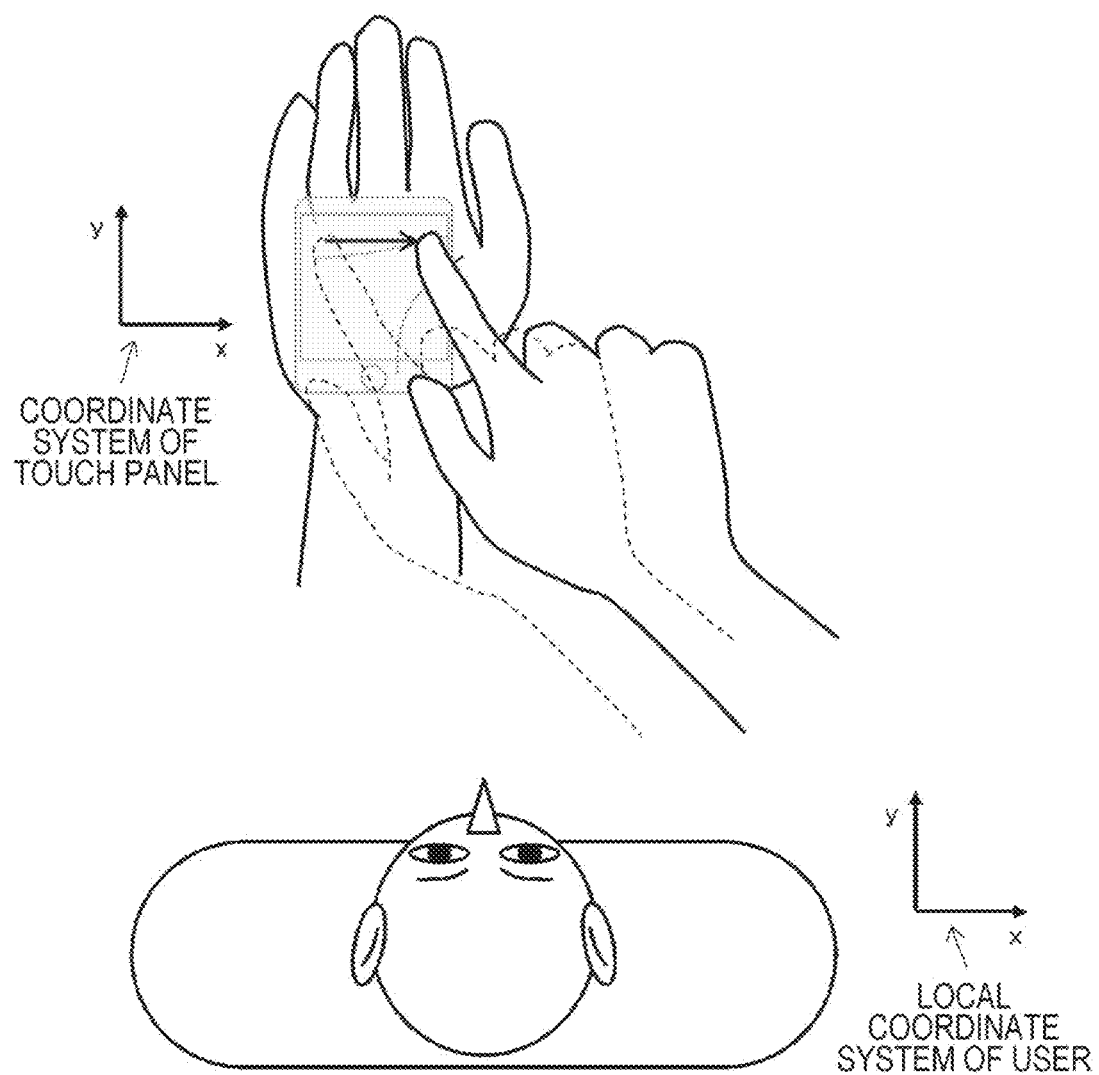
FIG. 22 is a diagram illustrating an example of arranging the operation UI for performing a coordinate input on a palm.
Figure 23:
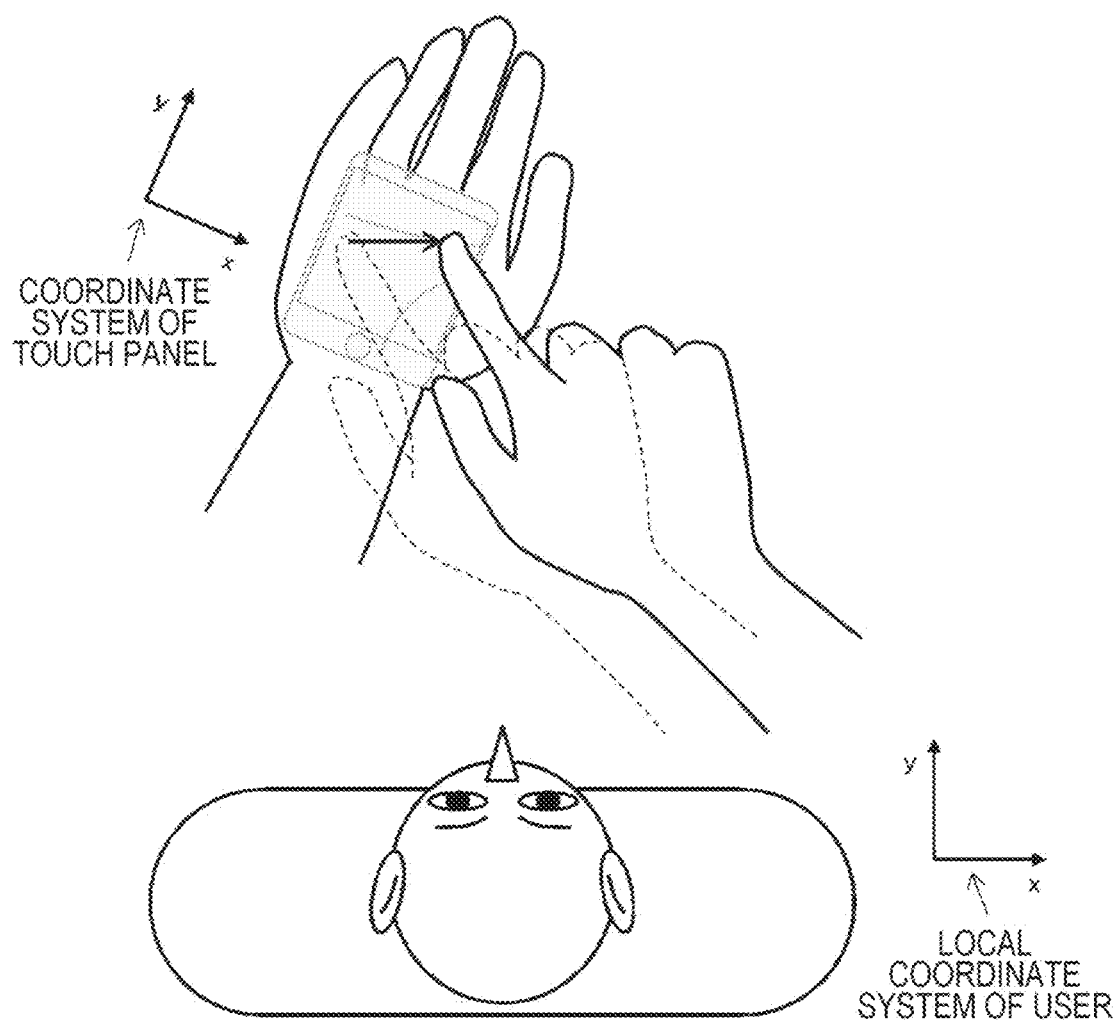
FIG. 23 is a diagram illustrating an example of arranging the operation UI for performing a coordinate input on a palm.

For example, as illustrated in FIG. 21, in a case of arranging an operation UI 2101 of a touch panel on the left palm of the user and operating the operation UI with the finger of the right hand wearing the controller 500 (or the first sensor unit 110), even if the user intends to perform a flick operation in a horizontal direction with the index finger of the right hand, there is a case where the input is not correctly performed depending on the position and posture of the left hand. Specifically, as illustrated in FIG. 22, if the position and posture of the left hand are set such that a coordinate system of the touch panel arranged on the palm of the left hand of the user coincides with (or is parallel to) a local coordinate system having the center of gravity of the user's body as an origin (or a local coordinate system imaged by the user's head), the finger gesture detection unit 605 can detect a coordinate input of the flick operation in the horizontal direction when the user performs the flick operation in the horizontal direction for the operation UI of the touch panel with the right hand. Meanwhile, as illustrated in FIG. 23, in a case of the posture of the left hand in which the coordinate system of the touch panel is inclined with respect to the local coordinate system of the user, the finger gesture detection unit 605 detects the coordinate input of the flick operation in an oblique direction even if the user intends to perform the flick operation in the horizontal direction with the right hand with reference to the local coordinate system of the user. For example, when the touch panel 2101 is arranged with reference to the coordinate system of the left hand recognized from the captured image of the outward camera 121 or the like, even if the same flick operation is performed with the right hand, a different coordinate input is performed according to the posture of the left hand.

Therefore, in the present embodiment, the direction of the operation UI to be arranged at the body part on which the operation UI for performing the coordinate input is arranged is corrected on the basis of the posture of the body part. For example, as illustrated in FIG. 21, in the case of arranging the operation UI 2101 of the touch panel on the palm of the left hand of the user, the posture of the left hand is acquired, and the direction (coordinate system) of the operation UI for performing the coordinate input is corrected on the basis of any one of the direction of the body of the user, the direction in which the object to be operated by the operation UI is arranged, or the line-of-sight direction of the user, instead of using the coordinate system of the body part detected by the finger position and posture detection unit 604 of the touch panel.

Figure 24:
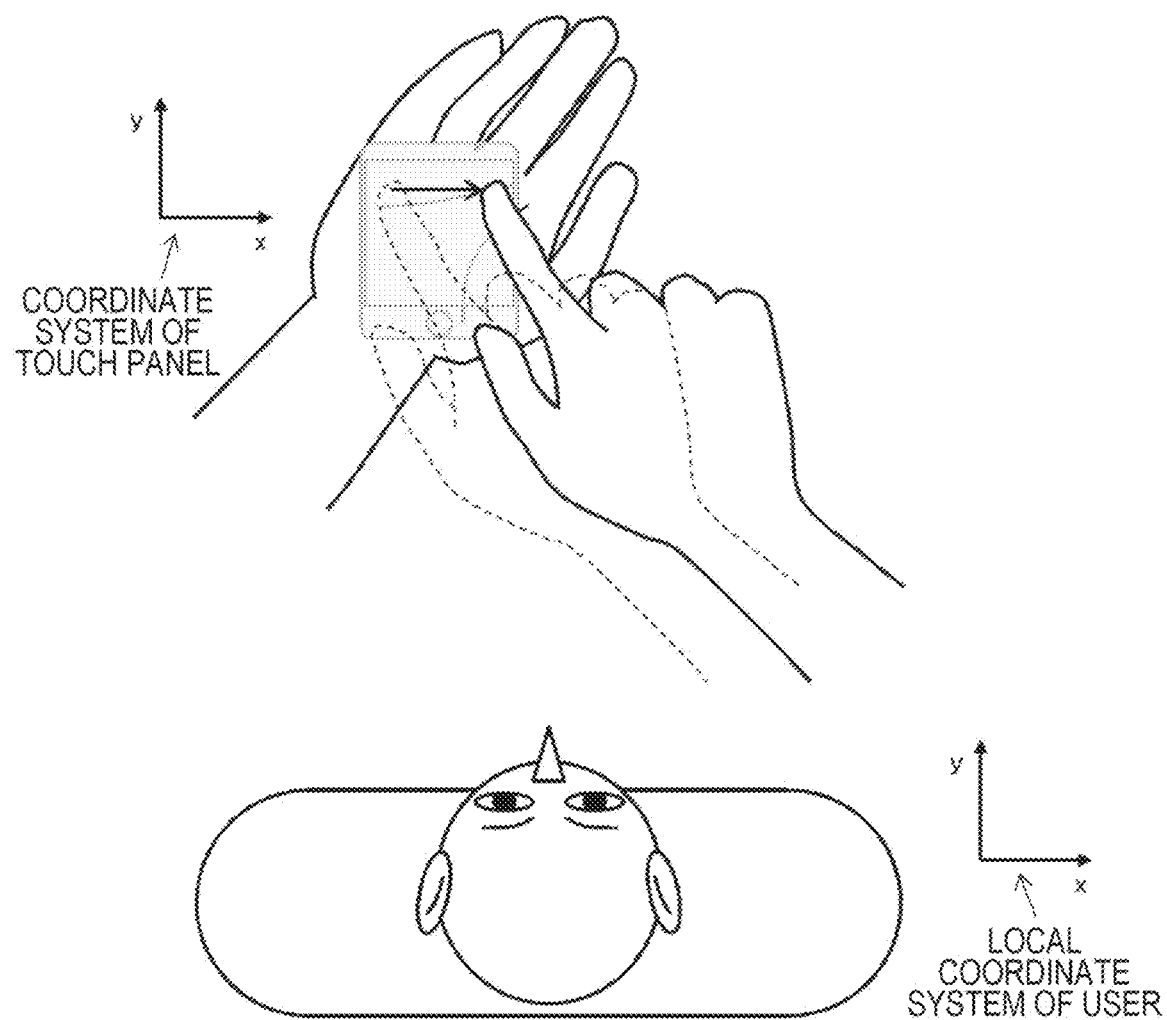
FIG. 24 is a diagram illustrating an example of arranging the operation UI for performing a coordinate input on a palm.

FIG. 24 illustrates an example of correcting the direction (coordinate system) of the operation UI for performing the coordinate input with reference to the direction of the body of the user. The application execution unit 601 can detect the direction of the body on the basis of, for example, the sensor information from the second sensor unit 120. Furthermore, the application execution unit 601 can detect the position and posture of the palm of the left hand of the user on the basis of, for example, the recognition result of the captured image of the outward camera 121. In a case where the first sensor unit 110 is also worn on the left hand, the position and posture of the left hand can be detected on the basis of the sensor information from the first sensor unit 110. Then, regardless of the posture of the left hand, the application execution unit 601 arranges the operation UI on the palm of the left hand of the user so that the direction of the operation UI coincides with the direction of the body (alternatively, the coordinate system of the operation UI and the local coordinate system of the user are parallel). In this case, when the user performs the flick operation in the horizontal direction for the operation UI of the touch panel with the right hand, the finger gesture detection unit 605 can detect the coordinate input of the flick operation in the horizontal direction.

Figure 25:
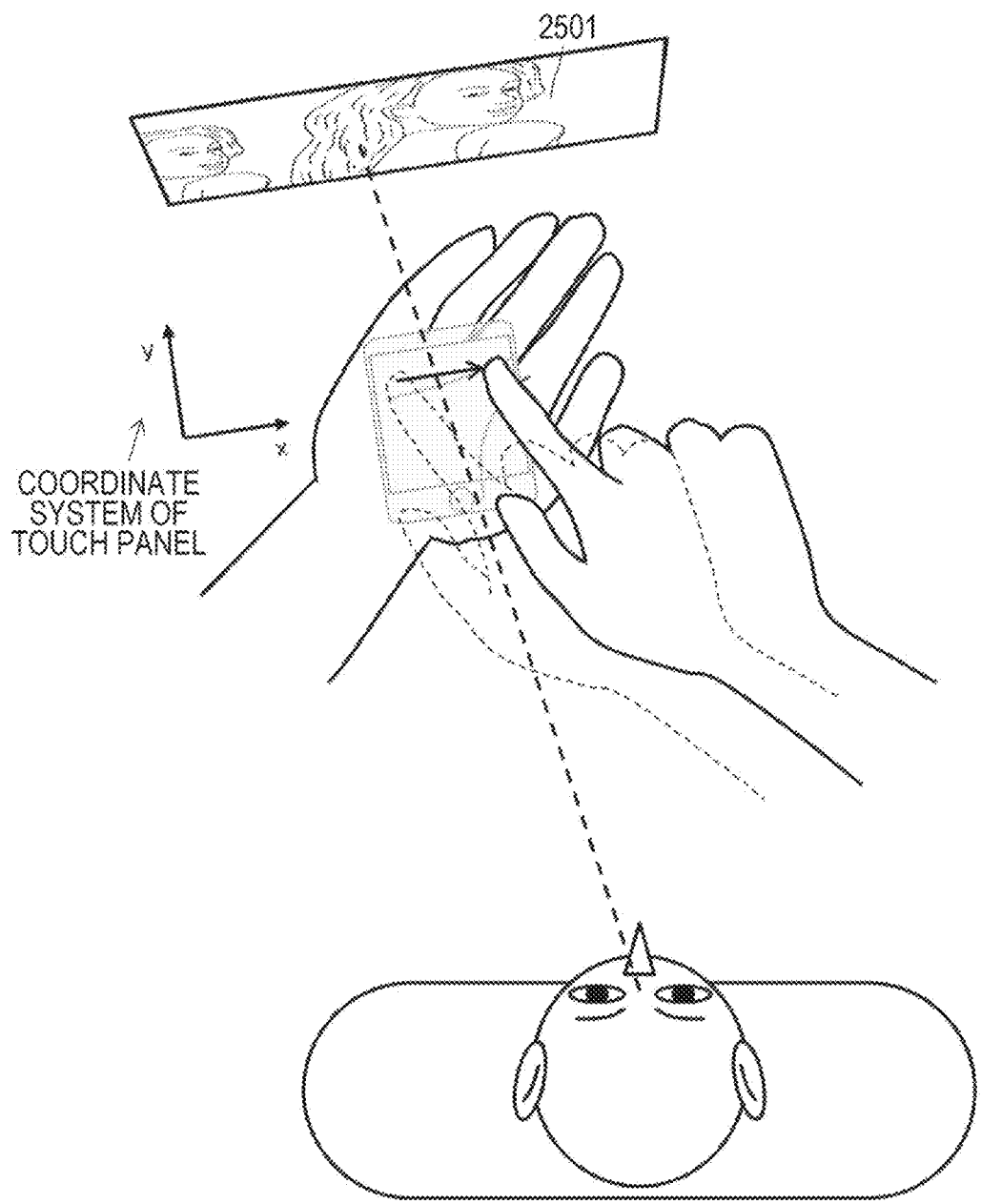
FIG. 25 is a diagram illustrating an example of arranging the operation UI for performing a coordinate input on a palm.

FIG. 25 illustrates an example of correcting the direction (coordinate system) of the operation UI for performing the coordinate input with reference to the direction in which the object to be operated by the operation UI is arranged. In FIG. 25, the operation UI to be operated is a virtual object of the AR application to be operated on the touch panel. The application execution unit 601 grasps the position where a virtual object 2501 of the AR application to be operated is arranged. Furthermore, the application execution unit 601 can detect the position and posture of the palm of the left hand of the user on the basis of, for example, the recognition result of the captured image of the outward camera 121. In a case where the first sensor unit 110 is also worn on the left hand, the position and posture of the left hand can be detected on the basis of the sensor information from the first sensor unit 110. Then, the application execution unit 601 arranges the operation UI on the palm of the left hand of the user so that the direction of the operation UI coincides with a front direction of the virtual object 2501 of the AR application to be operated. In this case, when the user performs the flick operation in the horizontal direction with the right hand following a plane on which the virtual object 2501 is arranged while viewing the virtual object 2501 of the AR application, the finger gesture detection unit 605 can detect the coordinate input of the flick operation in the horizontal direction for the virtual object 2501.

Figure 26:
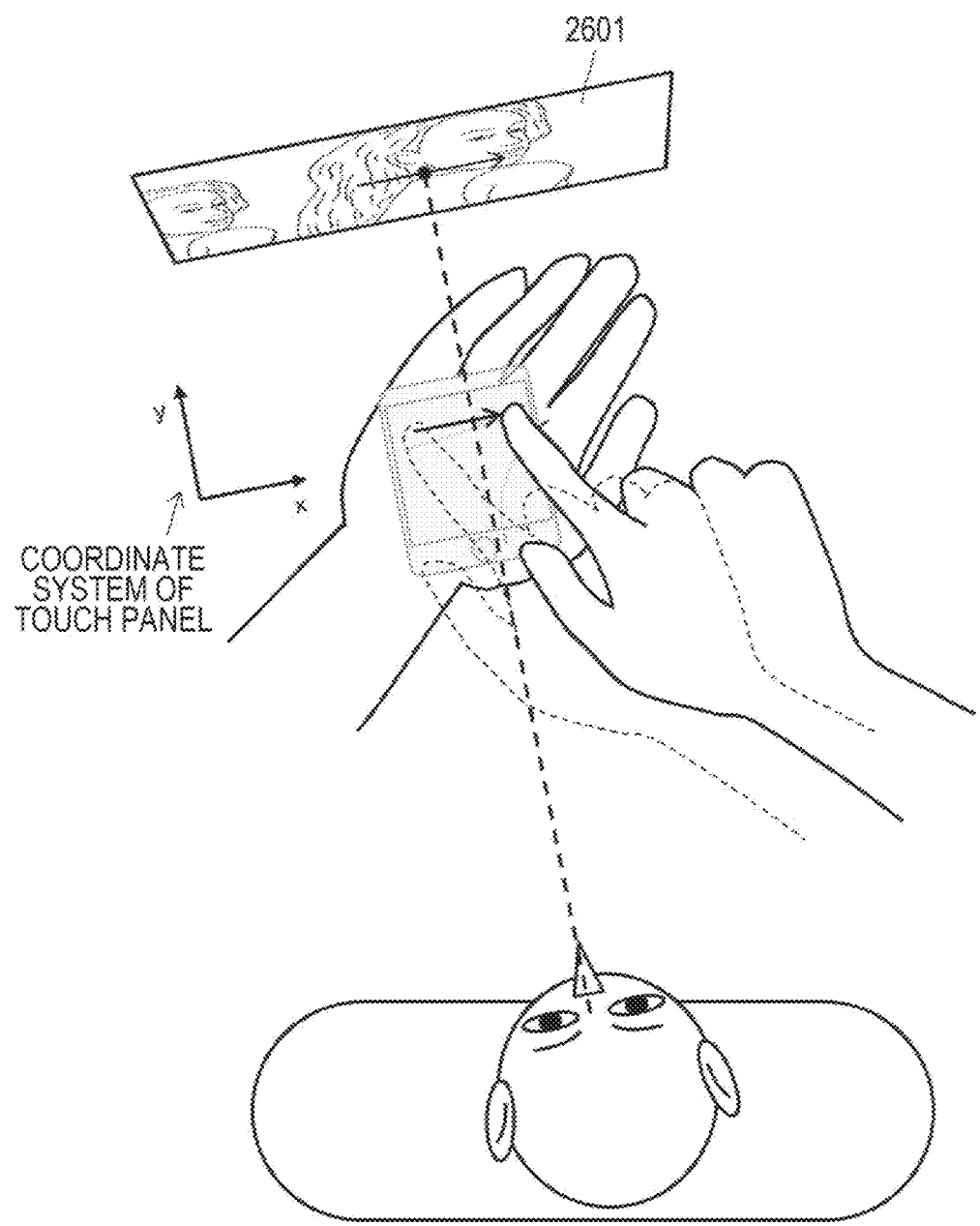
FIG. 26 is a diagram illustrating an example of arranging the operation UI for performing a coordinate input on a palm.

FIG. 26 illustrates an example of correcting the direction (coordinate system) of the operation UI for performing the coordinate input with reference to the line-of-sight of the user. For example, the application execution unit 601 recognizes an image of the position and posture of the head obtained from the sensor information of the second sensor unit 120 or of the eyes of the user captured by the inward camera 122, and detects the line-of-sight direction of the user. In the example illustrated in FIG. 26, the line-of-sight of the user is moving on a virtual object 2601 of the AR application. Furthermore, the application execution unit 601 can detect the position and posture of the palm of the left hand of the user on the basis of, for example, the recognition result of the captured image of the outward camera 121. In a case where the first sensor unit 110 is also worn on the left hand, the position and posture of the left hand can be detected on the basis of the sensor information from the first sensor unit 110. Then, the application execution unit 601 arranges the operation UI on the palm of the left hand of the user so that the direction of the operation UI coincides with the line-of-sight direction of the user to be operated. In this case, when the user performs the flick operation in the horizontal direction with the right hand with reference to the line-of-sight while viewing an arbitrary direction, the finger gesture detection unit 605 can detect the coordinate input of the flick operation in the horizontal direction for the virtual object 2601.

The example illustrated in FIG. 26 assumes a case where the user lies on a sofa and operates the AR application, for example. Although the direction of the palm of the hand when the user is lying on his/her back is greatly different from that in a standing position, the user's comfortable operation can be maintained by correcting the direction of the operation UI of the palm according to the rule of correcting the direction of the operation UI with reference to the line-of-sight direction of the user.

By correcting the direction of the operation UI by the method illustrated in FIGS. 24 to 26, an operation unintended by the user is not performed for the AR application, and a comfortable operation of the user can be implemented.

INDUSTRIAL APPLICABILITY

The present disclosure has been described in detail with reference to the specific embodiments. However, it is obvious that those skilled in the art can make modifications and substitutions of the embodiments without departing from the gist of the present disclosure.

In the present specification, the embodiments in which the present disclosure is mainly applied to the AR system have been mainly described, but the gist of the present disclosure is not limited thereto. For example, the present disclosure can be similarly applied to a VR system in which a virtual space is perceived as reality and an MR system in which reality and virtual reality are mixed.

In short, the present disclosure has been described in the form of examples, and the contents of description of the present specification should not be restrictively construed. To judge the gist of the present disclosure, the scope of claims should be taken into consideration.

Note that the present disclosure may have the following configurations.

(1) An information processing device including:
an acquisition unit configured to acquire a position and a posture, or a shape of a first part on a body of a user; and a control unit configured to control a virtual object to be displayed in a real space on a display device on the basis of the position and the posture, or the shape of the first part.

(2) The information processing device according to (1), in which
the acquisition unit acquires the position and the posture of the first part on the basis of a sensor attached to the first part.

(3) The information processing device according to any one of (1) or (2), in which
the first part includes a hand or a finger of the user, and
the acquisition unit acquires the position and the posture of the hand or the finger or the shape of the finger of the user on the basis of sensor information from a position and posture sensor attached to the hand or the finger of the user.

(4) The information processing device according to any one of (1) to (3), in which
the control unit recognizes that the first part has performed a predetermined operation for a second part on the body of the user on the basis of the position and the posture, or the shape of the first part.

(5) The information processing device according to any one of (1) to (4), in which,
when recognizing that the first part has performed a first operation for a second part on the body of the user on the basis of the position and the posture, or the shape of the first part acquired by the acquisition unit, the control unit stores an execution state of the virtual object in association with the second part, and stops display of the virtual object by the display device.

(6) The information processing device according to (5), in which,
when recognizing that the first part has performed a second operation for a second part on the body of the user on the basis of the position and the posture, or the shape of the first part acquired by the acquisition unit, the control unit restores the display of the virtual object on the basis of the execution state stored in association with the second part.

(7) The information processing device according to any one of (4) to (6), further including:
a detection unit configured to detect an area where the second part is installable on the body of the user.

(8) The information processing device according to (7), in which
the detection unit detects a location obtained by adding a predetermined offset from a third part of which the position and the posture are acquirable on the body of the user, as the second part.

(9) The information processing device according to any one of (7) or (8), in which
the detection unit detects an area on the body of which the position is estimatable on the basis of the position and the posture of the first part, as the second part.

(10) The information processing device according to any one of (7) to (9), in which
the detection unit detects the second part of which the position is estimatable by inverse kinematics calculation on the basis of position and posture information of the first part and a third part of which the positions and the postures are acquirable.

(11) The information processing device according to any one of (7) to (10), in which
the detection unit detects a size or a shape of the second part on the basis of operability by the first part.

(12) The information processing device according to any one of (7) to (11), in which
the detection unit detects the second part of which a location is specifiable by calibration of touching of the first part.

(13) The information processing device according to any one of (1) to (12), in which
the control unit controls an operation unit to be arranged at hand of the user, the operation unit being used by the user to perform an operation for the virtual object arranged far away from the user.

(14) The information processing device according to (13), in which
the control unit controls the operation unit to be arranged at a fourth part on the body of the user.

(15) The information processing device according to (14), in which
the control unit corrects a direction of the operation unit arranged at the fourth part.

(16) The information processing device according to (15), in which
the control unit corrects the direction of the operation unit with reference to any one of a direction of the body of the user, a direction in which the virtual object is arranged, or a line-of-sight direction of the user.

(17) An information processing method including:
an acquisition step of acquiring a position and a posture, or a shape of a first part on a body of a user; and
a control step of controlling a virtual object to be displayed in a real space on a display device on the basis of the position and the posture, or the shape of the first part.

(18) A computer program described in a computer-readable form to cause a computer to function as:
an acquisition unit configured to acquire a position and a posture, or a shape of a first part on a body of a user; and
a control unit configured to control a virtual object to be displayed in a real space on a display device on the basis of the position and the posture, or the shape of the first part.

(19) An augmented reality system including:
a display device configured to display a virtual object in a real space;
an acquisition unit configured to acquire a position and a posture, or a shape of a first part on a body of a user; and
a control unit configured to control display of the virtual object on the basis of the position and the posture, or the shape of the first part.

REFERENCE SIGNS LIST

100 AR system
110 First sensor
111 Gyro sensor
112 Acceleration sensor
113 Azimuth sensor
120 Second sensor unit
121 Outward camera
122 Inward camera
123 Microphone
124 Gyro sensor
125 Acceleration sensor
126 Azimuth sensor
131 Display unit
132 Speaker 133 Vibration presentation unit
134 Communication unit
140 Control unit
150 Storage unit
300 AR system
301 AR glasses
302 Controller
400 AR system
401 AR glasses
402 Controller
403 Information terminal
500 Controller
501, 502, or 503 IMU
511, 512, or 513 Band
601 Application execution unit
602 Head position and posture detection unit
603 Output control unit
604 Finger position and posture detection unit
605 Finger gesture detection unit
606 UI settable area detection unit

The invention claimed is:

1. An information processing device, comprising:
circuitry configured to:
acquire one of a position and a posture of a first part on a body of a user, or a shape of the first part on the body of the user;
detect an area of a second part on the body of the user based on the one of the position and the posture of the first part, or the shape of the first part, wherein the detected area corresponds to an area of installation of a user interface (UI) on the body of the user, and
the second part is different from the first part; and
control a virtual object based on the detected area and the one of the position of the first part on the body of the user, the posture of the first part, or the shape of the first part, wherein the virtual object is displayed in a real space on a display device.

2. The information processing device according to claim 1, wherein the circuitry is further configured to acquire the position and the posture of the first part based on a sensor attached to the first part.

3. The information processing device according to claim 1, wherein
the first part includes at least one of a hand of the user or a finger of the user, and
based on sensor information from a sensor attached to at least one of the hand of the user or the finger of the user, the circuitry is further configured to acquire at least one of
the position and the posture of the hand of the user or the finger of the user, or
the shape of the finger of the user.

4. The information processing device according to claim 1, wherein the circuitry is further configured to recognize a specific operation by the first part for the second part on the body of the user based on the one of the position and the posture of the first part, or the shape of the first part.

5. The information processing device according to claim 1, wherein the circuitry is further configured to:
recognize a first operation by the first part for the second part on the body of the user;
store, based on the recognition of the first operation, an execution state of the virtual object in association with the second part; and
stop display of the virtual object by the display device based on the recognition of the first operation.

6. The information processing device according to claim 5, wherein the circuitry is further configured to:
recognize a second operation by the first part for the second part on the body of the user; and
based on the recognition of the second operation, restore the display of the virtual object based on the execution state stored in association with the second part.

7. The information processing device according to claim 1, wherein the circuitry is further configured to:
add a specific offset from a third part on the body of the user;
determine a location on the body of the user based on the addition of the specific offset; and
detect, as the second part, the determined location.

8. The information processing device according to claim 1, wherein the circuitry is further configured to detect, as the second part, the area on the body of which the position of the first part is estimatable.

9. The information processing device according to claim 1, wherein the circuitry is further configured to:
detect, based on the position and the posture of the first part, a third part on the body of the user and the second part of which the position of the first part is estimatable; and
estimate the position of the first part based on an inverse kinematics calculation technology.

10. The information processing device according to claim 1, wherein the circuitry is further configured to detect one of a size of the second part or a shape of the second part based on operability of the first part.

11. The information processing device according to claim 1, wherein the circuitry is further configured to detect, based on a calibration of a touch operation of the first part, the second part of which a location is specifiable.

12. The information processing device according to claim 1, wherein
the circuitry is further configured to control an operation unit at a hand of the user,
the user controls the operation unit to operate the virtual object, and
the virtual object is at a specific distance from the user.

13. The information processing device according to claim 12, wherein the circuitry is further configured to control the operation unit at a fourth part on the body of the user.

14. The information processing device according to claim 13, wherein
the circuitry is further configured to correct a direction of the operation unit, and
the operation unit is at the fourth part.

15. The information processing device according to claim 14, wherein the circuitry is further configured to correct the direction of the operation unit with reference to one of a direction of the body of the user, a specific direction in which the virtual object is arranged, or a line-of-sight direction of the user.

16. An information processing method, comprising:
acquiring one of a position and a posture of a first part on a body of a user, or a shape of the first part on the body of the user;
detecting an area of a second part on the body of the user based on the one of the position and the posture of the first part, or the shape of the first part, wherein
the detected area corresponds to an area of installation of a user interface (UI) on the body of the user, and
the second part is different from the first part; and
controlling a virtual object based on the detected area and the one of the position and the posture of the first part, or the shape of the first part, wherein the virtual object is displayed in a real space on a display device.

17. A non-transitory computer-readable medium having stored thereon, computer-executable instructions which, when executed by a computer, cause the computer to execute operations, the operations comprising:
acquiring one of a position and a posture of a first part on a body of a user, or a shape of the first part on the body of the user;
detecting an area of a second part on the body of the user based on the one of the position and the posture of the first part, or the shape of the first part, wherein
the detected area corresponds to an area of installation of a user interface (UI) on the body of the user, and
the second part is different from the first part; and
controlling a virtual object based on the detected area and the one of the position and the posture of the first part, or the shape of the first part, wherein the virtual object is displayed in a real space on a display device.

18. An augmented reality system, comprising:
a display device configured to display a virtual object in a real space;
circuitry configured to:
acquire one of a position and a posture of a first part on a body of a user, or a shape of the first part on the body of the user;
detect an area of a second part on the body of the user based on the one of the position and the posture of the first part, or the shape of the first part, wherein
the detected area corresponds to an area of installation of a user interface (UI) of the body of the user, and
the second part is different from the first part; and
control the display of the virtual object on the display device based on the detected area and the one of the position and the posture of the first part, or the shape of the first part.

* * * * *